US008644705B2

(12) United States Patent
Barbarossa et al.

(10) Patent No.: US 8,644,705 B2
(45) Date of Patent: *Feb. 4, 2014

(54) METHOD, AND SYSTEM FOR A RE-CONFIGURABLE OPTICAL MULTIPLEXER, DEMULTIPLEXER AND OPTICAL ADD-DROP MULTIPLEXER

(75) Inventors: Giovanni Barbarossa, Saratoga, CA (US); Song Peng, Pleasanton, CA (US); Ming Li, Pleasanton, CA (US)

(73) Assignee: Oclaro (North America), Inc., San Jose, CA (US)

( * ) Notice: Subject to any disclaimer, the term of this patent is extended or adjusted under 35 U.S.C. 154(b) by 1067 days.

This patent is subject to a terminal disclaimer.

(21) Appl. No.: 11/934,640

(22) Filed: Nov. 2, 2007

(65) Prior Publication Data

US 2010/0329676 A1 Dec. 30, 2010

Related U.S. Application Data

(63) Continuation of application No. 10/442,826, filed on May 20, 2003, now Pat. No. 7,292,786.

(60) Provisional application No. 60/413,053, filed on Sep. 24, 2002.

(51) Int. Cl.
*H04J 14/02* (2006.01)
*H04J 14/06* (2006.01)

(52) U.S. Cl.
USPC .................................. 398/48; 398/49; 398/50

(58) Field of Classification Search
USPC ........... 398/82–84, 88, 45, 15, 16, 18, 43, 48, 398/65–69
See application file for complete search history.

(56) References Cited

U.S. PATENT DOCUMENTS

| | | | |
|---|---|---|---|
| 6,005,697 A * | 12/1999 | Wu et al. | 398/48 |
| 6,320,996 B1 * | 11/2001 | Scobey et al. | 385/18 |
| 6,337,935 B1 * | 1/2002 | Ford et al. | 385/24 |
| 6,634,810 B1 * | 10/2003 | Ford et al. | 398/88 |
| 6,753,960 B1 * | 6/2004 | Polynkin et al. | 356/330 |
| 6,947,628 B1 * | 9/2005 | Peng et al. | 385/18 |
| 7,236,660 B2 * | 6/2007 | Ducellier et al. | 385/24 |
| 7,292,786 B1 * | 11/2007 | Barbarossa et al. | 398/83 |
| 2002/0186434 A1 * | 12/2002 | Roorda et al. | 359/128 |
| 2003/0081321 A1 * | 5/2003 | Moon et al. | 359/619 |
| 2003/0137660 A1 * | 7/2003 | Solgaard et al. | 356/326 |
| 2003/0175030 A1 * | 9/2003 | Chen et al. | 398/85 |
| 2004/0086218 A1 * | 5/2004 | Liu et al. | 385/18 |
| 2005/0002600 A1 * | 1/2005 | Ducellier et al. | 385/17 |
| 2005/0100277 A1 * | 5/2005 | Frisken | 385/37 |
| 2005/0129404 A1 * | 6/2005 | Kim et al. | 398/84 |
| 2005/0213877 A1 * | 9/2005 | Wu et al. | 385/18 |

(Continued)

*Primary Examiner* — Nathan Curs
*Assistant Examiner* — Tanya Ngo
(74) *Attorney, Agent, or Firm* — Fenwick & West LLP

(57) ABSTRACT

A system for a re-configurable optical de-multiplexer, multiplexer or add/drop multiplexer is provided. A re-configurable de-multiplexer system comprises a wavelength selective switch having an input port, an output port and an internal port; a wavelength division de-multiplexer (WDM) optically coupled to the internal port and a plurality of dropped-channel ports optically coupled to the WDM. The wavelength selective switch receives a plurality of input wavelength-division multiplexed channels from the input port and routes a first subset of the channels to the output port and a second subset of channels to the internal port and then to the WDM. The WDM separates each of the dropped channels to a different respective one of the channel ports.

22 Claims, 20 Drawing Sheets

(56) References Cited

U.S. PATENT DOCUMENTS

| | | | |
|---|---|---|---|
| 2006/0198583 A1* | 9/2006 | Oikawa et al. | 385/53 |
| 2006/0245685 A1* | 11/2006 | Ducellier | 385/18 |
| 2006/0291773 A1* | 12/2006 | Wu et al. | 385/18 |
| 2007/0077003 A1* | 4/2007 | Aota et al. | 385/18 |
| 2007/0160321 A1* | 7/2007 | Wu et al. | 385/24 |
| 2007/0242953 A1* | 10/2007 | Keyworth et al. | 398/48 |
| 2008/0239444 A1* | 10/2008 | Aota et al. | 359/223 |
| 2009/0135488 A1* | 5/2009 | Aota et al. | 359/569 |

* cited by examiner

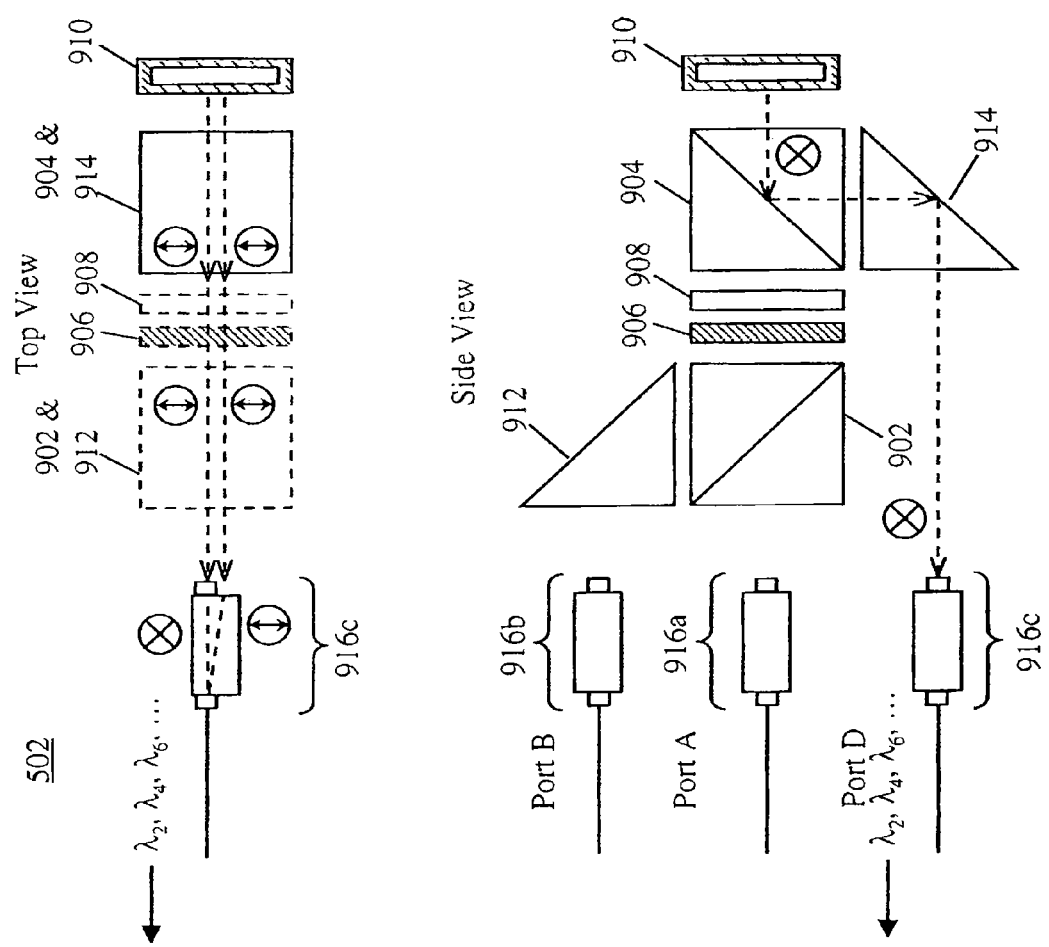

METHOD, AND SYSTEM FOR A RE-CONFIGURABLE OPTICAL MULTIPLEXER, DEMULTIPLEXER AND OPTICAL ADD-DROP MULTIPLEXER

CROSS-REFERENCE TO RELATED APPLICATIONS

This application is a continuation of U.S. patent application Ser. No. 10/442,826, filed May 20, 2003, now U.S. Pat. No. 7,292,786 which claims benefit of U.S. provisional patent application Ser. No. 60/413,053, filed Sep. 24, 2002. Each of the aforementioned related patent applications is herein incorporated by reference.

BACKGROUND OF THE INVENTION

1. Field of the Invention

The present invention relates to optical add and drop multiplexers and de-multiplexers that can either remove or add a plurality of arbitrary channels selected form a larger set of wavelength-division multiplexed channels. More particularly, the present invention relates to such add and drop multiplexers that are re-configurable, such that the dropped and/or added wavelengths may be selectively changed during operation.

Description of the Related Art

In a wavelength division multiplexing optical communication system, information is carried by multiple channels, each with a distinct wavelength range. In this document, these individual information-carrying lights are referred to as either "signals" or "channels" and the totality of multiple combined signals, wherein each signal is of a different wavelength range, is referred to as a "composite optical signal." Each one of the individual channels is identified by its representative or central wavelength, $\lambda_i$, where i is an index variable. Accordingly, a set of n channels is denoted generally denoted by the notation $\lambda_1$-$\lambda_n$. A set of logically related channels is represented by the Greek letter, $\lambda$ enclosed in brackets—for instance, a set of express channels is denoted by $\{\lambda_{exp}\}$, a set of dropped channels is denoted by $\{\lambda_{drop}\}$ and a set of added channels is denoted by $\{\lambda'\}$.

It is often necessary to add or drop a wavelength channel in optical links or networks. This can be achieved by a wavelength switch that sends different wavelength channels to different locations or pathways. If the pathways of the wavelengths can be selected or changed, such switches are re-configurable. Accordingly, a wavelength switch that extracts certain channels delivered from an input port and sends the selected extracted channels to a "drop" port and sends the remaining, or "express", channels to another port, is a re-configurable de-multiplexer. Likewise, a wavelength switch that receives certain selected channels from an "add" port and that combines these channels together with express channels is a re-configurable multiplexer. A wavelength switch that performs both such drop and add operations as is a re-configurable add-drop multiplexer.

A conventional re-configurable de-multiplexer is illustrated in FIG. 12A. A conventional re-configurable multiplexer is generally constructed similarly to the apparatus illustrated in FIG. 12A, but with optical channels propagating in opposite directions to those shown. The prior-art re-configurable de-multiplexer 700 shown in FIG. 12 comprises an input port 702, a de-multiplexer 704, a plurality of n de-multiplexer output ports 706.1-706.n, a plurality of n 1×2 optical switches 708.1-708.n, wherein each such switch is optically coupled to a respective one of the multiplexer output ports, a plurality of n dropped-channel ports 710.1-710.n optically coupled to the 1×2 optical switches, a plurality of n express-channel ports 712.1-712.n optically coupled to the 1×2 optical switches, a multiplexer 714 optically coupled to the express channel ports and an output port 716.

The input port 702 comprising the conventional re-configurable de-multiplexer 700 delivers a plurality, n, of wavelength-division multiplexed channels, denoted $\lambda_1$-$\lambda_n$, to the de-multiplexer 704, which separates the channels such that each channel is delivered to a different respective one of the de-multiplexer output ports 706.1-706.n. For instance, the de-multiplexer 704 delivers channel $\lambda_1$ to the de-multiplexer output port 706.1, channel $\lambda_2$ to the de-multiplexer output port 706.2, channel $\lambda_3$ to the de-multiplexer output port 706.3 and channel $\lambda_1$ to the de-multiplexer output port 706.n. The 1×2 switch 708.1 receives only the channel $\lambda_1$ and can switch this channel $\lambda_1$ to either the dropped-channel port 710.1 or to the express channel port 712.1. Likewise, each of the switches 708.2-708.n switches receives a different respective channel and switches it to either a dropped-channel port or to an express channel port. The multiplexer 714 receives channels from the express channel ports, re-combines these channels by wavelength-division multiplexing, and outputs the combined channels to the output port 716.

In the example shown in FIG. 12A, the switches 708.1 and 708.3 are shown in a configuration that sends the channels $\lambda_1$ and $\lambda_3$ to the dropped-channel ports 710.1 and 710.3, respectively and the switches 708.2 and 708.2 are shown in another configuration that sends the channels $\lambda_2$ and $\lambda_n$ to the express channel ports 712.2 and 712.n, respectively. Each one of the other switches (not shown) of the plurality of 1×2 switches may likewise be in either one of the same two configurations. Each switch can operate independently of all the remaining switches, so that any arbitrary set of channels may be dropped (i.e., delivered to a dropped-channel port), whilst the remaining express channels are re-multiplexed by the multiplexer 714 and output to the output port 716.

A conventional re-configurable add-drop multiplexer is illustrated in FIG. 12B. The conventional re-configurable add-drop multiplexer 750 shown in FIG. 12B is similar to the conventional de-multiplexer shown in FIG. 12A, except that provision is made to replace the dropped channels with replacement, or "added" channels, comprising the same respective wavelengths as the dropped channels. For clarity of presentation, only the possible pathways of three wavelengths $\lambda_1$, $\lambda_2$ and $\lambda_3$ are shown in FIG. 12B, although a much larger number of wavelength-division multiplexed channels might travel through the apparatus 750. Since the conventional add-drop multiplexer 750 both adds and drops channels, it comprises a plurality of 2×2 optical switches 709.1-709.3, instead of the previously described 1×2 optical switches. The conventional add-drop multiplexer 750 also comprises a plurality of added channel ports 711.1-711.3, with each such added channel port optically coupled to a respective one of the 2×2 switches.

In the example shown in FIG. 12B, the switch 709.2 is shown in a configuration that sends the channel $\lambda_2$ from the de-multiplexer output port 706.2 to the dropped-channel port 7102 and simultaneously sends the added channel $\lambda'_2$ from the added channel port 711.2 to the express channel port 712.2. The switches 709.1 and 709.3 are shown in another configuration that sends the channels $\lambda_1$ and $\lambda_3$ to the express channel ports 712.1 and 712.3, respectively. Thus, the channel $\lambda_2$ is dropped and replaced by the channel $\lambda'_2$; the channels routed to the output port comprise the three channels $\lambda_1$, $\lambda'_2$ and $\lambda_3$.

Although the conventional re-configurable de-multiplexer (FIG. 12A) and the conventional re-configurable add-drop multiplexer (FIG. 12B) can adequately perform their intended functions, it may be readily observed that, in order to maintain the flexibility of dropping (and, possibly, adding) anyone of the input channels, a separate 1×2 (or 2×2) switch is required for each one of the plurality of channels. Further, the conventional re-configurable de-multiplexer and conventional re-configurable add-drop multiplexer require provision of as many drop ports and as many add ports as the total number of possible input wavelengths. In practice, however, most network routing situations will only require a small subset of the original plurality of input channels to be dropped (and, possibly, replaced by added channels). Therefore, the requirement, in each of the described conventional apparatuses, for a separate switch corresponding to each channel adds unnecessary bulk, cost and complexity to these conventional apparatuses. There exists a need, therefore, for a re-configurable de-multiplexer, multiplexer or add/drop multiplexer that can add and/or drop multiple wavelengths and that retains the flexibility of adding or dropping any selected wavelength without requiring a separate switch for each wavelength. The present invention addresses this need.

SUMMARY OF THE INVENTION

The current invention discloses a system for a re-configurable de-multiplexer, multiplexer or add/drop multiplexer. A preferred embodiment of a re-configurable de-multiplexer system in accordance with the present invention comprises a 1×2 wavelength selective switch, an input port, output port and internal port all optically coupled to the 1×2 wavelength selective switch, a wavelength division multiplexer (WDM) optically coupled to the internal port and a plurality of channel ports optically coupled to the WDM. The 1×2 wavelength selective switch receives a plurality of input wavelength-division multiplexed channels from the input port and routes the channels to either the output port or to the internal port and then to the WDM. The WDM, which is capable of separating channels within more than one wavelength range, then separates each of the dropped channels to a different respective one of the channel ports.

A 1×2 wavelength switch utilized within the preferred embodiment of a re-configurable de-multiplexer system in accordance with the present invention may comprise a switch input and two switch outputs, a wavelength dispersive medium optically coupled to the switch input and the two switch outputs, a lens optically coupled to the wavelength dispersive medium and a segmented beam steering apparatus optically coupled to the lens opposite to the wavelength dispersive medium.

A WDM utilized within the preferred embodiment of a re-configurable de-multiplexer in accordance with the present invention may comprise a plurality of interleaved channel separators arranged in a multi-stage parallel cascade configuration, wherein each interleaved channel separator may be switchable.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 9B and 9C are each a top view and a side view of the 1×2 interleaved channel separator of FIG. 9A showing, respectively, the return pathways therethrough of signal light rays of odd channels and of even channels.

DETAILED DESCRIPTION

The present invention provides a system for a re-configurable optical de-multiplexer, re-configurable optical multiplexer and re-configurable optical add/drop multiplexer. The following description is presented to enable one of ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown, but is to be accorded the widest scope consistent with the principles and features described herein. In order to gain a detailed understanding of the construction and operation of the present invention, the reader is referred to the appended FIGS. 1A-11 in conjunction with the following description.

Figure 1A:
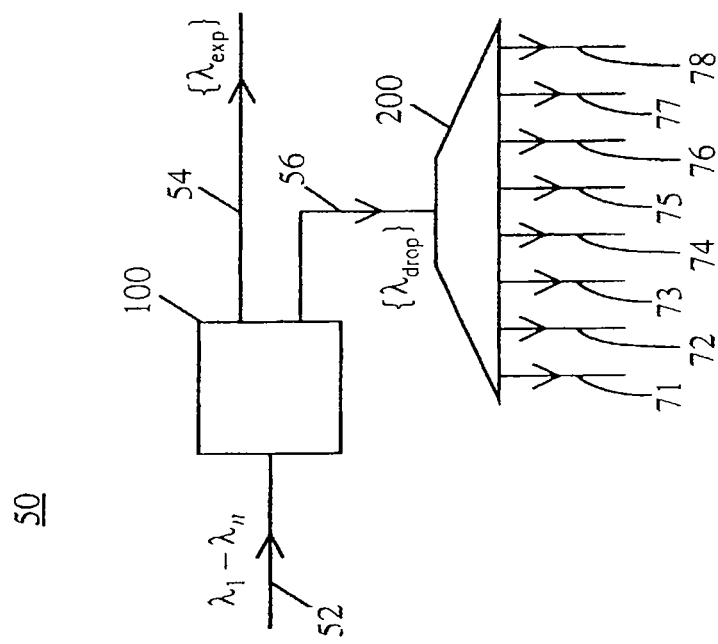
FIG. 1A is a schematic diagram of a preferred embodiment of a re-configurable optical de-multiplexer in accordance with the present invention.

FIG. 1A is a schematic diagram of a preferred embodiment of a re-configurable optical de-multiplexer in accordance with the present invention. The re-configurable optical de-multiplexer 50 shown in FIG. 1A comprises a 1×2 wavelength selective switch 100 optically coupled, via an internal port 56, to a wavelength division de-multiplexer (WDM) 200. The re-configurable optical de-multiplexer 50 further comprises an input port 52 and an output port 54 optically coupled to the 1×2 wavelength selective switch 100 and a plurality of channel ports 71-78 optically coupled to the WDM 200. The 1×2 wavelength selective switch 100 receives a plurality of input wavelength-division multiplexed channels, denoted $\lambda_1$-$\lambda_n$, from the input port 52 and routes the channels to either the output port 54 or to the internal port 56. Thus, the channels delivered to the WDM 200 through the internal port 56, which are the dropped channels $\{\lambda_{drop}\}$, represent a subset of all the input channels $\lambda_1$-$\lambda_n$. The express channels $\{\lambda_{exp}\}$ are routed to the output port 54. The WDM 200 then separates each of the dropped channels to a different respective one of the channel ports 71-78. Examples of the 1×2 wavelength selective switch 100 and the WDM 200 are illustrated in subsequent drawings and described in more detail later in this discussion.

Figure 1B:
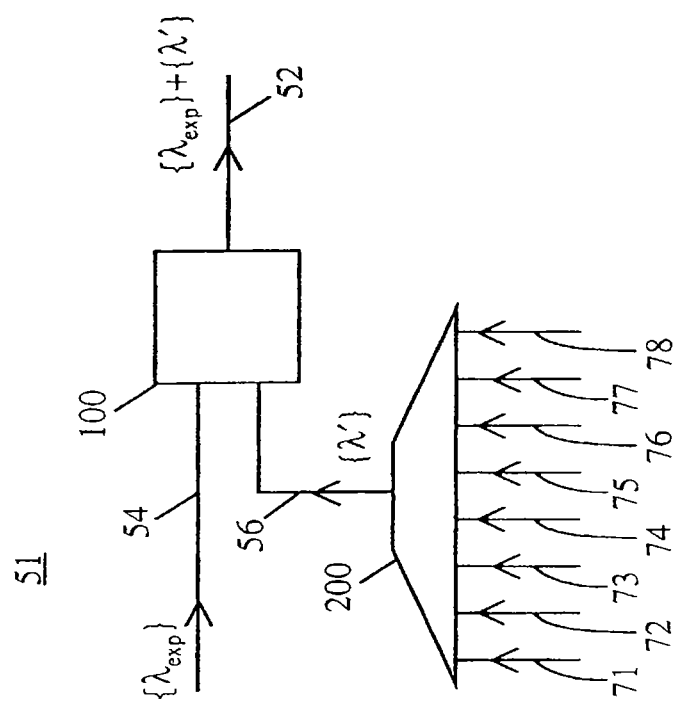
FIG. 1B is a schematic diagram of a preferred embodiment of a re-configurable optical multiplexer in accordance with the present invention.

FIG. 1B is a schematic diagram of a preferred embodiment of a re-configurable optical multiplexer in accordance with the present invention. The re-configurable optical multiplexer 51 shown in FIG. 1B is identical to the re-configurable optical de-multiplexer 50 except that channels are routed through the system 51 oppositely to their routing through the system 50. Thus, the WDM 200, operating in reverse as a multiplexer, receives a different respective added channel from each one of the channel ports 71-78 and routes the set of all these added channels $\{\lambda'\}$ to the internal port 56. The 1×2 wavelength selective switch 100 receives the added channels from the internal port 56 and receives a set of express channels $\{\lambda_{exp}\}$ from the port 54. The 1×2 wavelength selective switch 100 combines the added channels together with the express channels and routes the resulting composite optical signal, comprising both the set of express channels $\{\lambda_{exp}\}$ and the set of added channels, $\{\lambda'\}$ to the port 52.

Figure 1C:
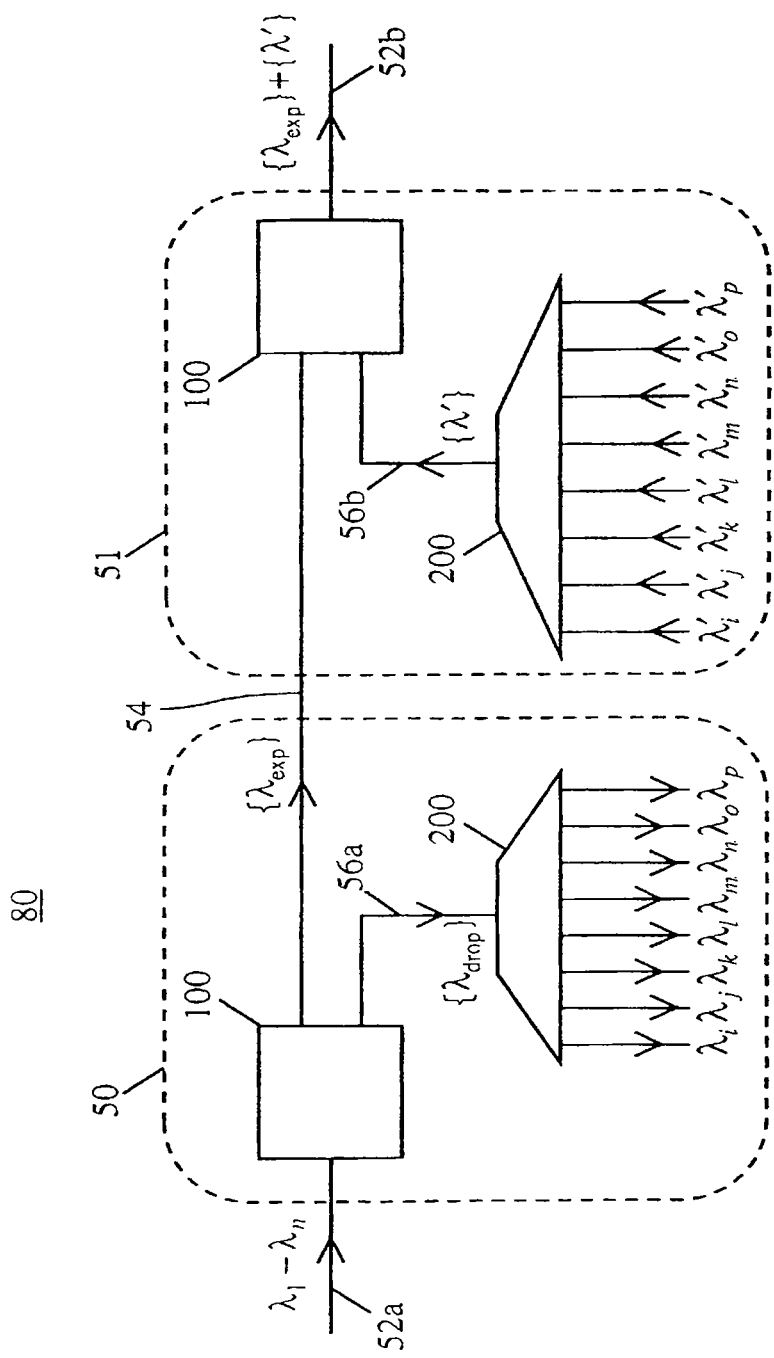
FIG. 1C is a schematic diagram of a preferred embodiment of a re-configurable optical add/drop multiplexer in accordance with the present invention.

FIG. 1C is a schematic diagram of a preferred embodiment of a re-configurable Optical add/drop multiplexer in accordance with the present invention. The re-configurable optical add/drop multiplexer 80 shown in FIG. 1C is constructed simply by optically coupling the re-configurable optical de-multiplexer 50 to the re-configurable optical multiplexer 51. The re-configurable optical add/drop multiplexer 80 drops a set of selected channels $\{\lambda_{drop}\}$, comprising the channels $\lambda_i$, $\lambda_j$, $\lambda_k$, $\lambda_l$, $\lambda_m$, $\lambda_n$, $\lambda_o$ and $\lambda_p$, from an optical communications system and replaces these dropped channels with a set of added $\{\lambda'\}$ channels, comprising the channels $\lambda'_i$, $\lambda'_j$, $\lambda'_k$, $\lambda'_l$, $\lambda'_m$, $\lambda'_n$, $\lambda'_o$ and $\lambda'_p$, comprising the same wavelengths as the dropped channels.

Figure 2A:
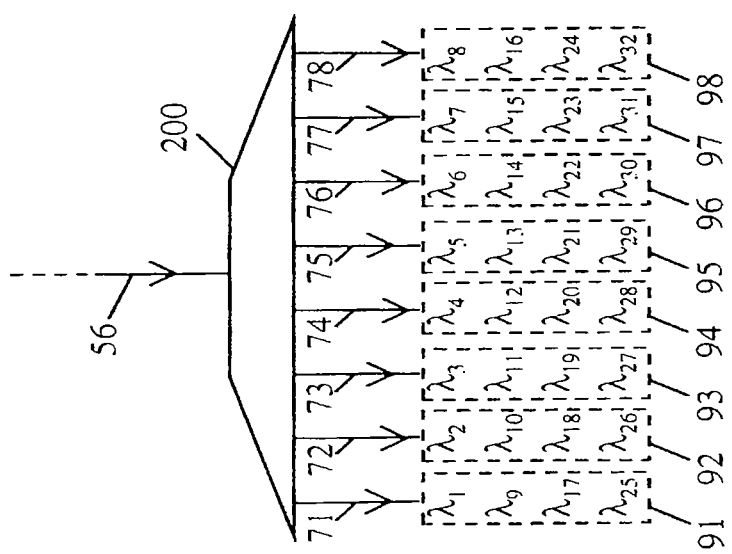
FIG. 2A is a map of the channels that may be output at the channel ports of a reconfigurable optical de-multiplexer in accordance with the present invention.

The WDM 200 utilized within the re-configurable de-multiplexer 50, within the re-configurable multiplexer 51 and within the re-configurable optical add/drop multiplexer 80 is herein referred to as a "colorless" WDM, since it is capable of separating channels within more than one wavelength range. To further illustrate this "colorless" operation, FIG. 2A provides a map of the channels routed to the various channel ports, under the assumption that the original composite optical signal comprises thirty-two wavelength-division multiplexed channels and that there are eight different channel ports 71-78. The 1×2 wavelength switch 100 routes any selected eight of the channels $\lambda_1$-$\lambda_{32}$ through the optical port 56 to the colorless WDM 200. The colorless WDM 100 then separates the selected channels to a different respective one of the channel ports 71-78. The WDM 200 is "colorless" because it will route any of the four channels listed in each of column 91, 92, 93, 94, 95, 96, 97 and 98 to the channel port 71, 72, 73, 74, 75, 76, 77 and 78, respectively. Assuming that only one channel is to be routed to each channel port, then no greater than one channel listed within each of the columns 91-98 should be delivered to the WDM 200. However, the WDM 200 is capable of separating any single channel within anyone of the columns from any channel listed in any of the other columns. Each row of channels (reading across the various columns) comprises a different wavelength range. The channels $\lambda_1$-$\lambda_8$ comprise a first wavelength range or band. Likewise the channels $\lambda_9$-$\lambda_{16}$, $\lambda_{17}$-$\lambda_{24}$ and $\lambda_{25}$-$\lambda_{32}$ respectively comprise second, third and fourth wavelength ranges. The colorless operation of the WDM 100 permits separation of channels selected from among any of these ranges.

Figure 2B:
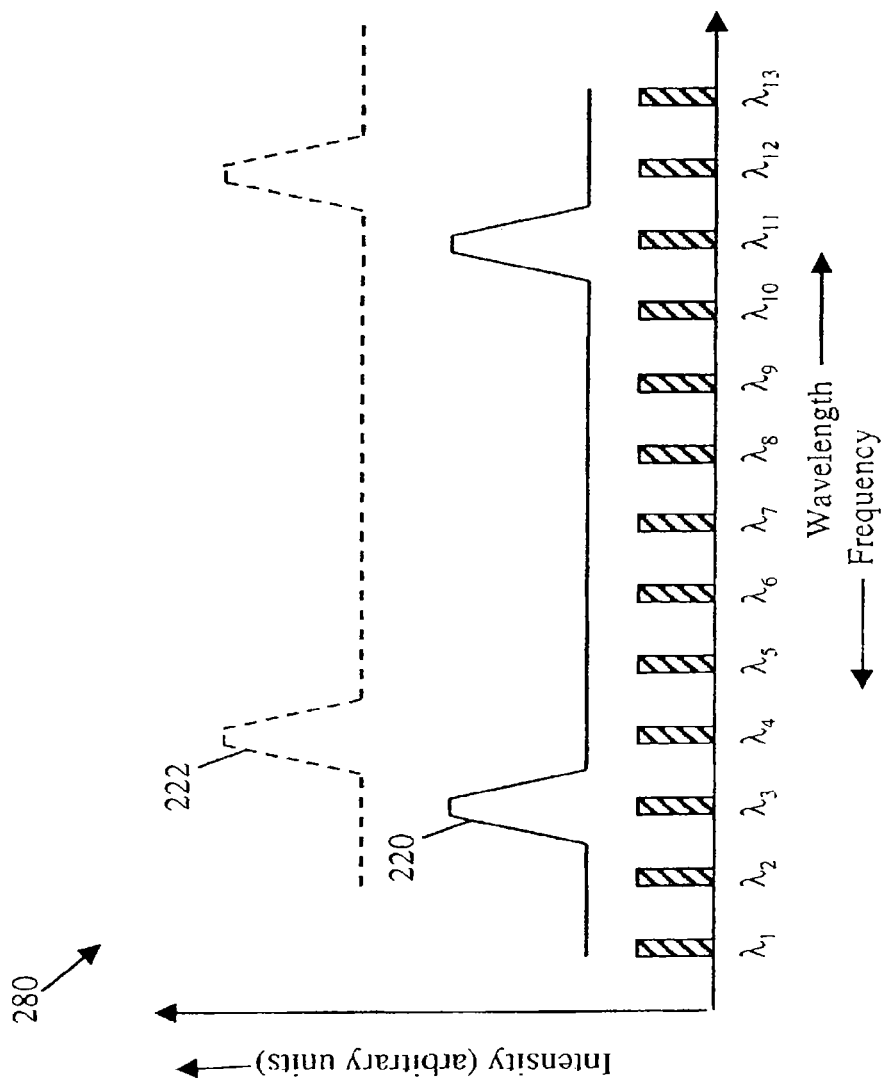
FIG. 2B is a diagram of the pass bands of two different channel ports of a reconfigurable optical de-multiplexer in accordance with the present invention.

FIG. 2B is a schematic diagram of the pass bands of two different outputs of a re-configurable optical de-multiplexer in accordance with the present invention. FIG. 2B provides similar information to that provided by FIG. 2A, but in a different format. The graph 280 shown in FIG. 2B shows the wavelength positions of several channels, denoted $\lambda_1$, $\lambda_2$, . . . , $\lambda_{13}$, along its base. The graph 280 also shows a schematic curve 220 of the pass bands of a first channel port and a schematic curve 222 of the pass bands of a second channel port. Assume that the curve 220 refers to the pass bands of channel port 71 and that the curve 222 refers to the pass bands of channel port 72. Then, if the re-configurable optical de-multiplexer is configured so that, for instance, channel $\lambda_3$, is output at channel port 71, the channel $\lambda_{11}$ and every eighth channel thereafter can also be output at channel port 71. Simultaneously, a different channel will be output at channel port 72. If channel $\lambda_4$, for instance, is output at channel port 72, the channel $\lambda_{12}$ and every eighth channel thereafter can also be output at channel port 72. Generally, the pairs of channels $\lambda_3$ and $\lambda_{11}$, $\lambda_4$ and $\lambda_{12}$, etc. will not be output simultaneously.

Although, in the example given above, a channel port of a colorless WDM is described as outputting every eighth channel, the separation between channels output at each channel port need not be equal to eight channels, but could be any other number of channels. Generally, however, the channel separation between channels output at any channel port of a colorless WDM will be equal to the total number of channel ports.

Figure 3A:
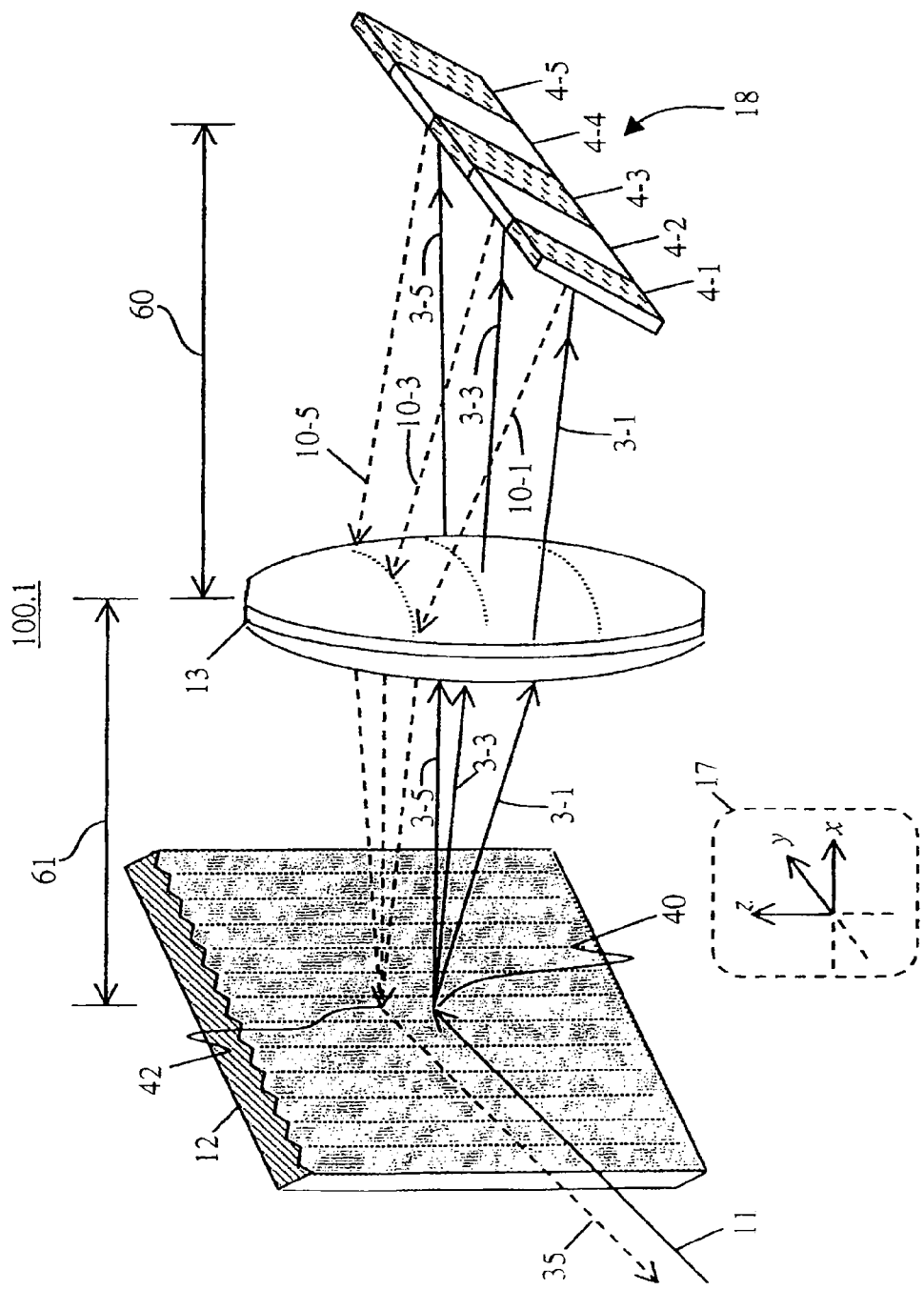
FIG. 3A is an illustration of a first 1×2 wavelength selective switch showing the pathways of a first set of optical channels to a first output.

Reference is now made to FIGS. 3A-5, which illustrate preferred 1×2 wavelength selective switches that may be used as the apparatus 100 within the re-configurable optical de-multiplexer 50, the re-configurable optical multiplexer 51 and the re-configurable optical add-drop multiplexer 80. FIGS. 3A-3B illustrate a first such 1×2 wavelength selective switch 100.1. The 1×2 wavelength selective switch 100.1 has been disclosed in a co-pending U.S. patent application titled "An Optical Wavelength Router using Reflective Surfaces to Direct Output Signals, Ser. No. 09/794,590, filed on Feb. 26, 2001 and assigned to the assignee of the present invention. Applicant hereby incorporates this co-pending application herein by reference in its entirety. FIG. 3A illustrates the pathways of a first set of optical channels through the wavelength-selective switch 100.1 to a first output. FIG. 3B illustrates the pathways of a second set of optical channels through the same wavelength-selective switch 100.1 to a second output.

Figure 3B:
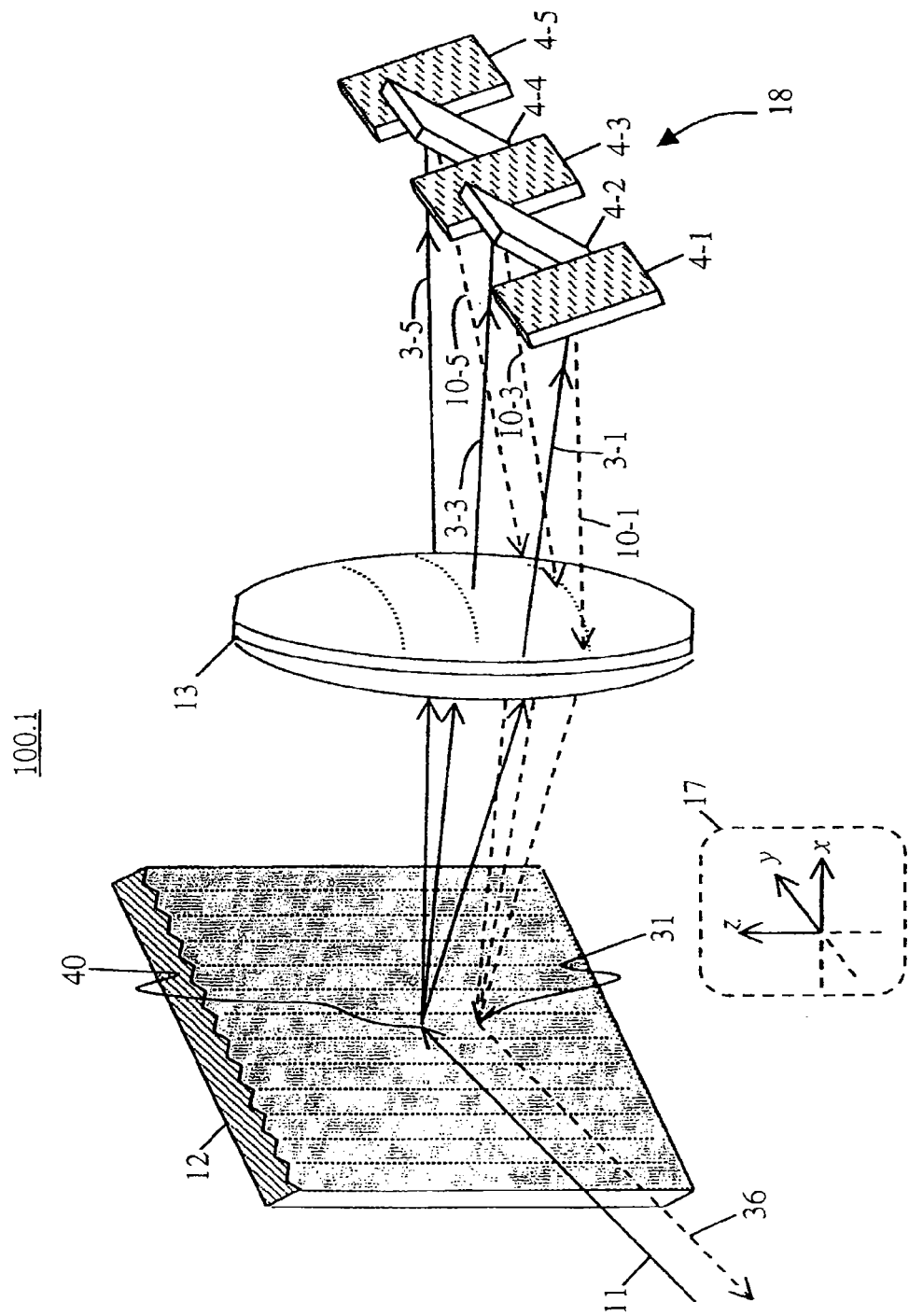
FIG. 3B is another illustration of the 1×2 wavelength selective switch of FIG. 3A, showing the pathways of a second set of optical channels to a second output.

The 1×2 wavelength selective switch 100.1 shown in FIGS. 3A-3B comprises a reflective apparatus 18, lens 13, and dispersive medium 12. Reflective apparatus 18 includes n number of pixels, each comprising an independently moveable reflective segment. In the present example, n=5 and the pixels are denoted 4-1 through 4-5 (for simplicity, the mechanical elements are not shown). Although the present example is limited to 5 pixels and, thus, five channels, the reflective apparatus may comprise any number n of pixels. Pixels 4-1 through 4-5 are aligned along the y-direction as defined by coordinate system 17. A single, broadband optical input signal 11 (a light beam) travels substantially in the y-direction, as defined by coordinate system 17, towards spot 40 of dispersive medium 12. Input signal 11 includes a multiplexed multichannel set of optical signals. Dispersive medium 12 is typically a wavelength-dispersive medium, for example, a diffraction grating or a prism. Dispersive medium 12 divides input signal 11 into wavelength-separated input components 3-1 through 3-5, shown by solid lines in FIGS. 3A-3B. Each one of the multiplexed signals is separated into one of the wavelength-separated input components 3-1 through 3-5. The wavelength-separated input components 3-1 through 3-5 travel substantially in the x-direction as defined by coordinates 17, towards lens 13. Lens 13 focuses each of the input components 3-1 through 3-5 onto pixels 4-1 through 4-5 of reflective apparatus 8. Lens 13 may be a set of two or more lens elements. Input components 3-1 through 3-5 each strike one of the pixels 4-1 through 4-5. Therefore, the number of pixels (n, equal to 5 in this example) and the number of input components (n) are the same. For clarity, only the three input components 3-1, 3-3, and 3-5 are shown in FIGS. 3A-3B.

As used herein, pixel 4-$i$ refers to an arbitrary one of pixels 4-1 through 4-5 and input component 3-$i$ refers to an arbitrary one of input components 3-1 through 3-5. Pixel 4-$i$ directly or indirectly reflects input component 3-$i$ back to dispersive medium 12 in a selected direction. The wavelength-separated light beam traveling from reflective apparatus 18 back to dispersive medium 12 is referred to as output component 10-$i$, which is one of output components 10-1 through 10-5. In the 1×2 wavelength selective switch of 100.1 FIGS. 3A-3B, each of pixels 4-1 through 4-5 is configured to reflect an incident input component 3-$i$ at one of at least two angles. The output components 10 through 10-5 travel back to lens 13. The angle at which each component 10-1 through 10-5 travels is determined by the setting of the particular pixel that directs the particular output component. For clarity, only the three input components 10-1, 10-3, and 10-5 are shown in FIGS. 3A-3B.

Lens 13 focuses input components 3-1 through 3-5 onto pixels 4-1 through 4-5. Also, lens 13 directs output components 10-1 through 10-5 onto dispersive medium 12. By passing through lens 13, each output component 10-1 through 10-5 is collimated. In order to achieve the collimation, lens 13 may be spaced first focal length 60 away from the plane of reflective apparatus 8. First focal length 60 is the focal length of lens 13 in the medium (e.g., air) between lens 13 and reflective apparatus 18. Lens 13 may also be spaced by second focal length 61 from dispersive medium 12. Second focal length 61 is the focal length of lens 13 in the medium between lens 13 and dispersive medium 12.

Output components, from amongst output components 10-1 through 10-5, that strike the same spot on dispersive medium 12 are directed into the same output port. The number of output ports is determined by the number of settings of pixel 4-$i$, since the setting of pixel 4-$i$ determines the direction of output component 10-$i$. The number of available settings affects the number of directions in which output component 10-$i$ can travel, which, in turn, affects the number and the position of spots on dispersive medium 12 that output components 10-1 through 10-5 pass through. The number of spots on dispersive medium 12 through which output components 10-1 through 10-5 pass is equal to the number of output ports. If each pixel 4-$i$ comprises two settings, then there are two output ports.

FIG. 3A depicts, using dashed lines, one of the two possible directions in which output components 10-1 through 10-5 can travel, assuming two possible settings for each pixel. FIG. 3B depicts, also using dashed lines, the other one of the two possible directions in which output components 10-1 through 10-5 can travel. When reflective apparatus 4-$i$ is set to reflect output components 10-$i$ in the direction indicated in FIG. 3A, the output component 10-$i$ is directed by lens 13 onto spot 42 of dispersive medium 12. Output components reflected by other pixels in the direction indicated in FIG. 3A are also directed onto spot 42, and are then directed into the first output port 35. Similarly, pixels 4-1 through 4-5 can each be set to reflect an incident input component 3-1 through 3-5 in the direction shown by the dashed lines in FIG. 3B. The output components 10-1 through 10-5 traveling in the direction of the dashed lines in FIG. 3B are directed by lens 13 onto spot 31 of dispersive medium 12. From spot 31, output components travel toward second output port 36.

Among the n number of micro-mirror pixels that are included in the 1×2 wavelength-selective switch 1, some micro-mirror pixels may be configured as shown in FIG. 3A, whilst others are configured as shown in FIG. 3B. Thus, in general, some output channels will be directed to output port 35 (FIG. 3A), while, at the same time, other output channels will be directed to output port 36 (FIG. 3B). In FIG. 3A, the mirror pixels 4-1, 4-3, and 4-5 (shaded) are shown disposed so as to deflect the three output components 10-1, 10-3, and 10-5, comprising the wavelengths $\lambda_1$, $\lambda_3$, and $\lambda_5$, respectively, to spot 42 and then to output port 35. In FIG. 3B, the mirror pixels 4-1, 4-3, and 4-5 are shown disposed so as to deflect the output components 10-1, 10-3, and 10-5, respectively, to spot 31 and then to output port 36.

Figure 4:
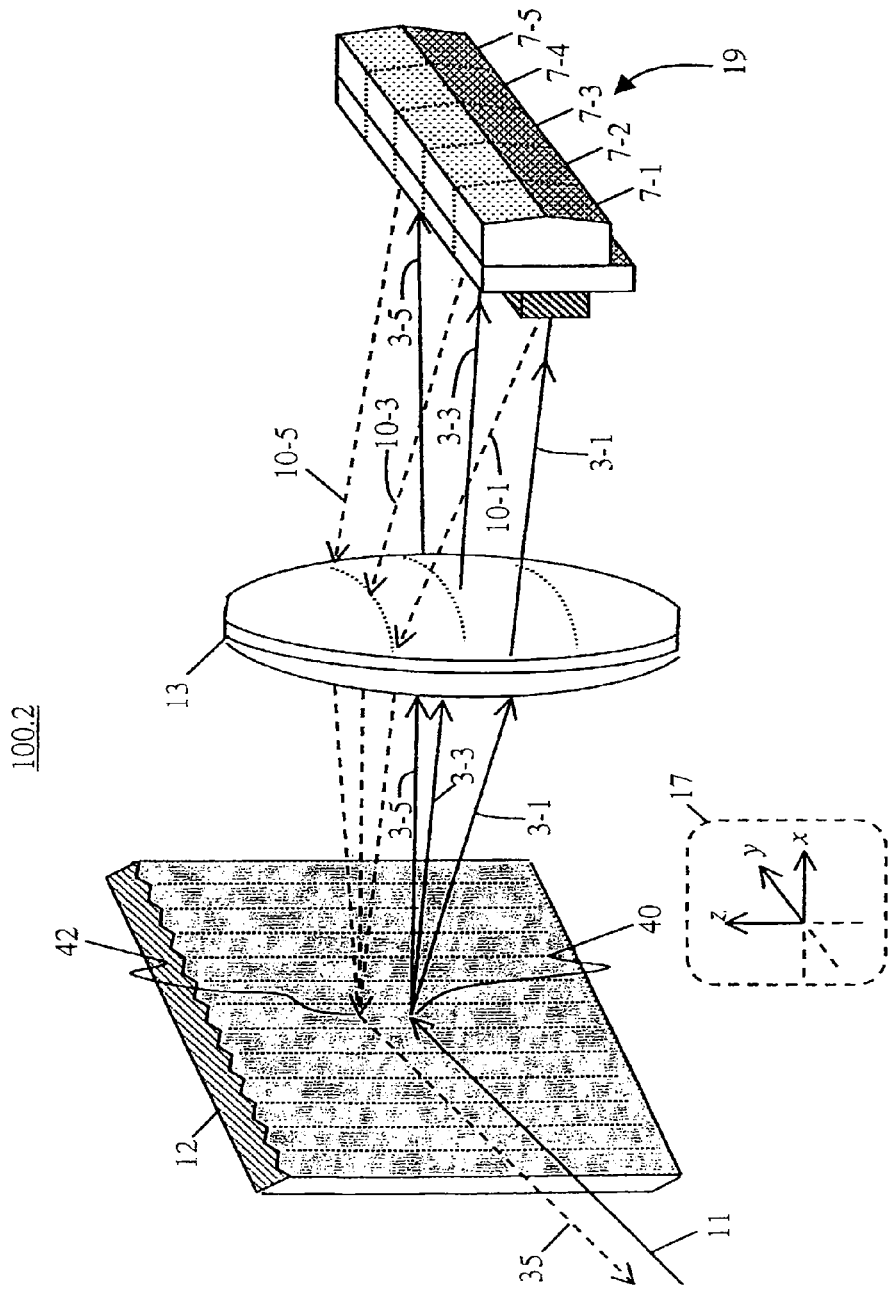
FIG. 4 is an illustration of a second 1×2 wavelength selective switch showing the pathways of a first set of optical channels to a first output.

FIG. 4 is an illustration of a second 1×2 wavelength selective switch 100.2 that may be used within the re-configurable optical de-multiplexer 50. The 1×2 wavelength selective switch 100.2 shown in FIG. 4, which is also disclosed in the aforementioned co-pending U.S. patent application with Ser. No. 09/794,590, is similar to the switch 100.1 shown in FIGS. 3A-3B except that the previously described micro-mirror array reflective apparatus is replaced by a polarization steering device 19. The polarization steering device comprises no moving parts and, instead, comprises a plurality of individually controlled "pixels" 7-1 through 7-5, such that each pixel routes a respective channel according to its polarization. FIG. 4 shows the pathways, through the apparatus 100.2, of a first set of optical channels to a first output.

Figure 5:
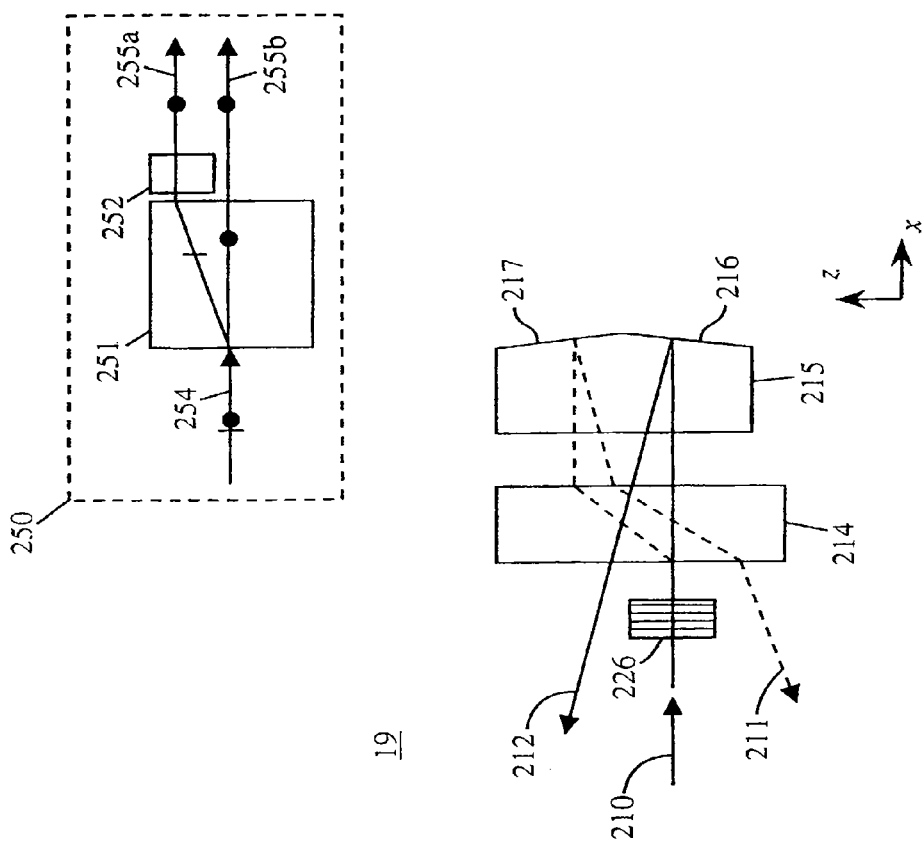
FIG. 5 is a diagram of a beam steering component utilized within the 1×2 wavelength selective switch of FIG. 4.

FIG. 5 shows, in greater detail, a cross section of an individual "pixel" comprising the element 19 of the apparatus 100.2. FIG. 5 represents a projection within the x-z plane. The pixel of the polarization steering device element 19 consists of a polarization modulator 226, a birefringent polarization beam displacer 214 and an angled reflector 215. The polarization modulator 226 can be a magneto-optical device, a liquid crystal device, or other polarization modulator that can rotate polarization of incident beams. The birefringent polarization beam displacer 214 is a planar parallel uni-axial crystal plate with its optic axis inclined in the x-z plane. The angled reflector 215 comprises two reflective surfaces 216 and 217.

After passing through the polarization modulator 226 (FIG. 5), the incident beam 210 becomes polarized parallel to either the y or z axis depending on a control signal sent to the polarization modulator 226. If the beam after the modulator 226 is polarized in the y-axis, it is not displaced by the beam displacer 214. In this case the beam will be reflected by surface 216 forming returned beam 212. On the other hand, if after passing through the polarization modulator, the beam becomes polarized in the z-direction, the beam will be displaced by beam displacer 214 with a vector component of the displacement along the z-direction. Because of the displacement, the beam will be reflected by surface 217, which makes an angle from surface 216. The returned beam 211 thus will propagate in a direction significantly different from beam 212. The required displacement of beam displacer 214 is on the order of the beam size at the reflecting surfaces. In case the incident beam 210 is focused on the reflecting surfaces 216-217, the required displacement can be fairly small. Because displacement is linearly proportional to the thickness of the beam displacer, this means a very thin beam displacer will be sufficient.

In order to direct different wavelength channels into different output ports, the polarization modulator 226 is pixelized in the z direction. In other words, the polarization steering device 19 comprises a plurality of devices similar to that shown in FIG. 5, wherein the separate devices are disposed along a line or curve in extending into or out of the plane of the drawing of FIG. 5. Each such separate "pixel" or individual segment of the polarization modulator 226 defines a pixel or individual element of the polarization steering device 19. The single beam displacer 214 and angled reflector 215 can suffice for all such pixels of the polarization steering device 19. However, a different pixel of the polarization modulator 226 is generally required for each respective pixel of the polarization steering device 19. The polarization steering device 19 can replace the micro-mirror array reflective apparatus 18 in FIGS. 3A-3B. The input beam 210 will be focused onto the two mirror surfaces 216 and 217. Because the polarization steering device can be fairly thin, defocus effects at the polarization modulator may be negligible.

Although the input beam 11 and the wavelength-separated input components 3-1 through 3-5 (FIGS. 3A-3C) are assumed to be linearly polarized in the apparatus 100.2, the apparatus can easily handle arbitrarily polarized and unpolarized input beams. As shown in the inset 250 in FIG. 5, an arbitrarily polarized or unpolarized beam 254 can be separated into two parallel beams 255a-255b with a birefringent beam displacer 251. After the beam displacer 251, a half-wave plate 252 is inserted into one of the beams to rotate the polarization by 90 degrees. The output beams are thus both linearly polarized parallel to one another. Using this device 250 in the input beam 11 and output beams 35, 36, the operation of the 1×2 wavelength selective switch 100.2 becomes independent of input beam polarization.

Figure 6:
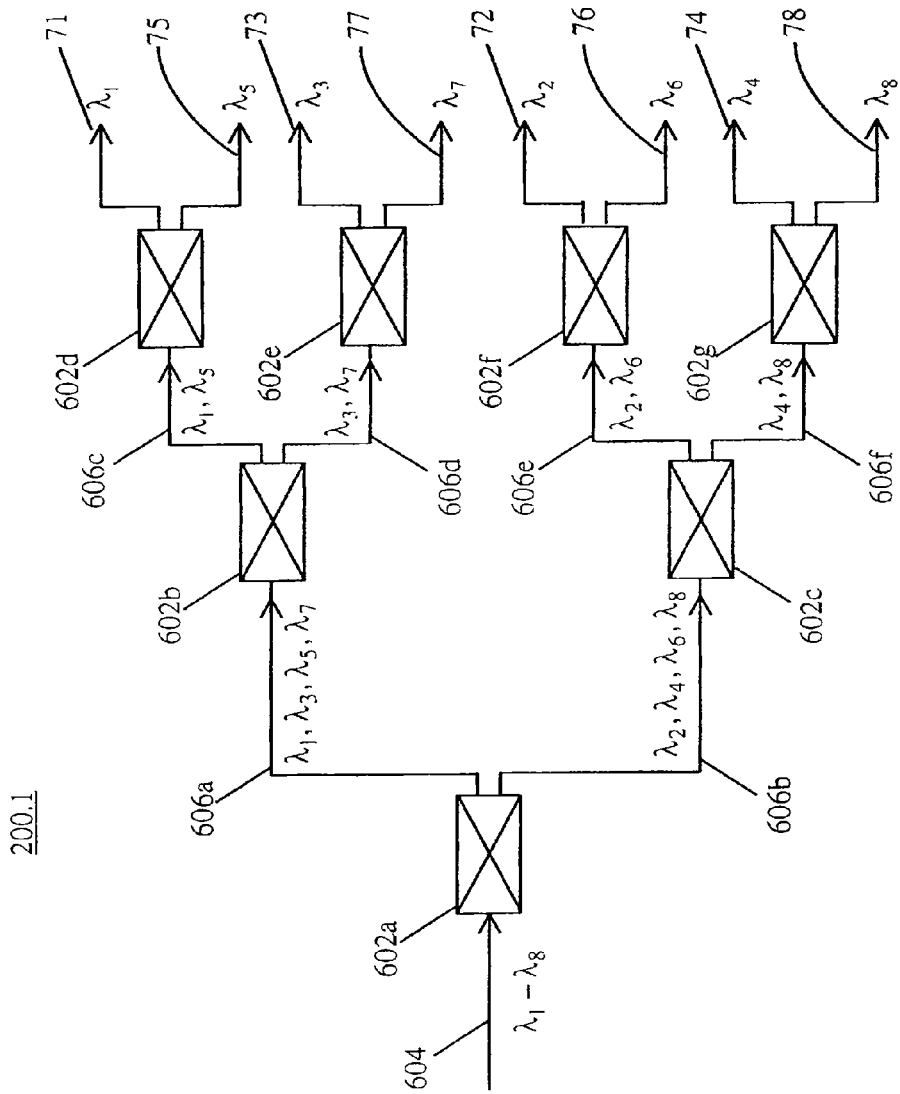
FIG. 6 is a schematic illustration of a wavelength division de-multiplexer that utilizes 1×2 interleaved channel separator apparatuses configured in a multi-stage parallel cascade configuration.
Figure 7:
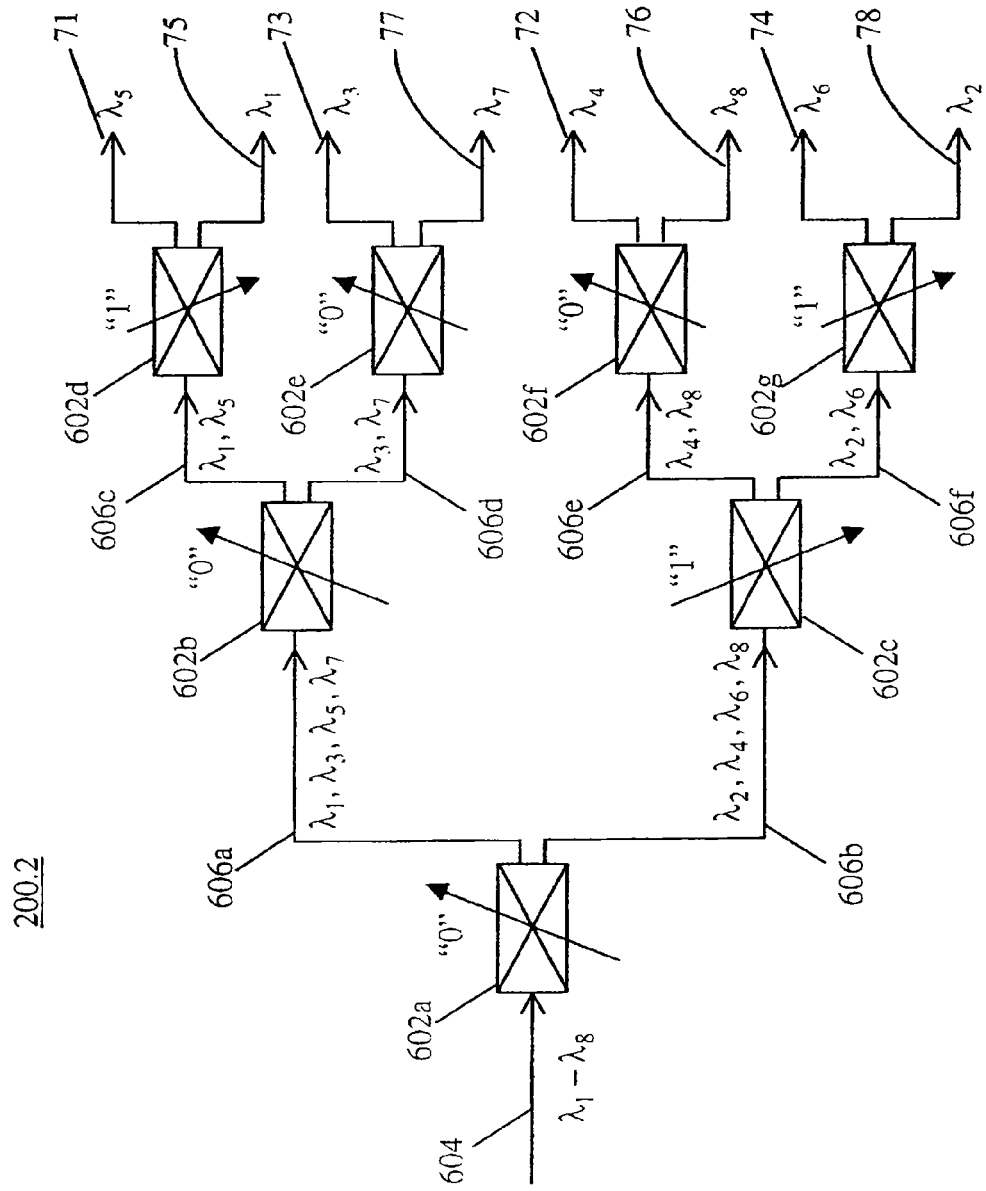
FIG. 7 is a schematic illustration of a wavelength division de-multiplexer that utilizes 1×2 switchable interleaved channel separator apparatuses configured in a multi-stage parallel cascade configuration.
Figure 8:
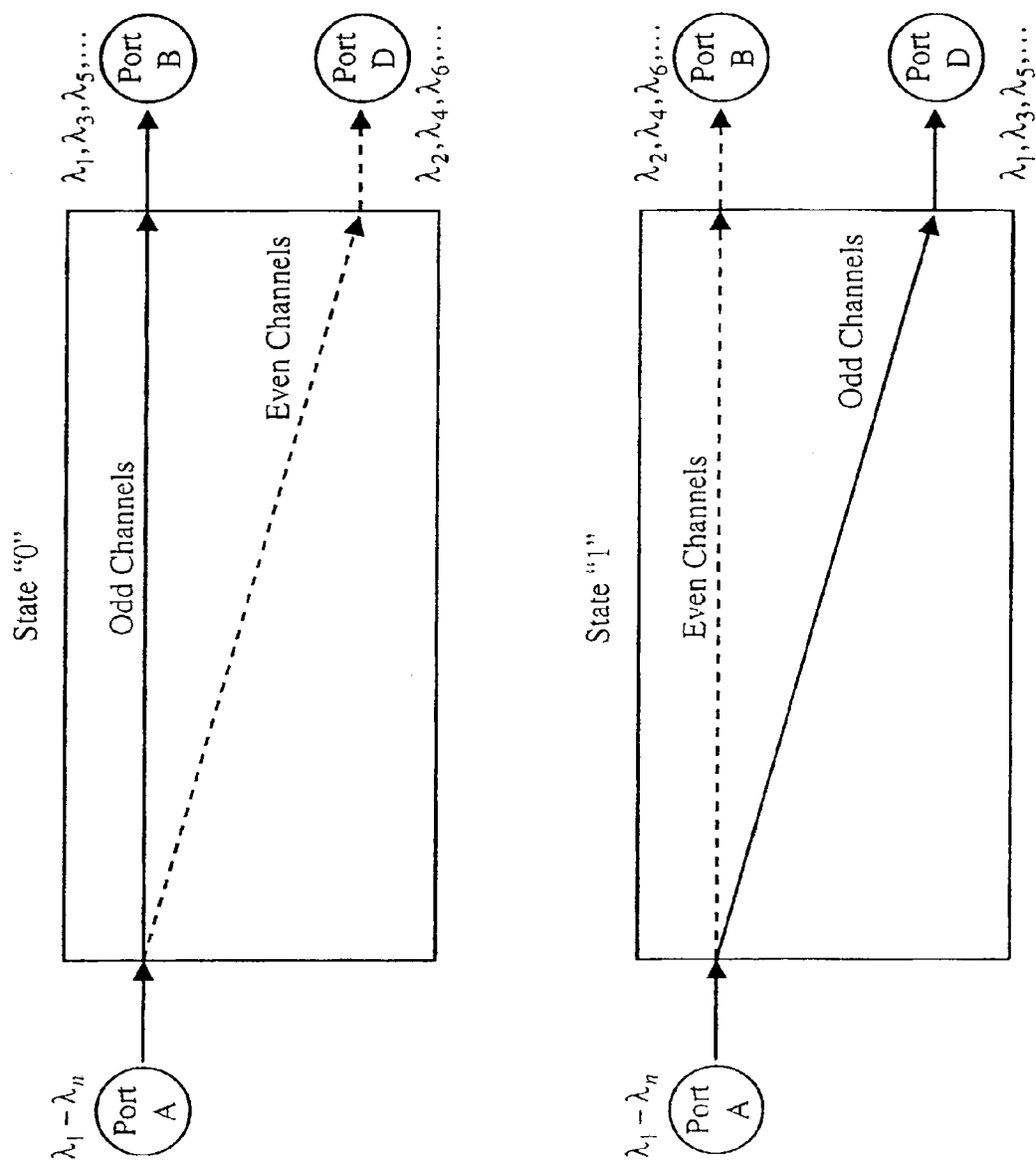
FIG. 8 is a functional signal routing diagram of a 1×2 switchable interleaved channel separator apparatus.

Reference is now made to FIGS. 6-8, which illustrate the functioning of preferred WDM's that may be used as the WDM 200 within the re-configurable optical de-multiplexer 50 (FIG. 1A), the re-configurable optical multiplexer 51 (FIG. 1B) or the re-configurable optical add-drop multiplexer 80 (FIG. 1C). FIG. 6 illustrates a WDM apparatus 200.1 comprising a multi-stage parallel cascade configuration of interleaved channel separators. The WDM 200.1 comprises an input port 604, a plurality of interleaved channel separator devices 602a, 602b, 602c, . . . optically coupled in a parallel cascade configuration by a plurality of optical couplings 606a, 606b, 606c, . . . and a plurality of channel ports 71, 72, 73, . . . , wherein the input port 604 carries a wavelength division multiplexed composite optical signal and each of the channel ports carries an individual signal or channel. Generally the input port, the channel ports and the optical couplings will all comprise optical fibers, but may comprise, in whole or in part, any form of optical coupling devices, such as lenses, mirrors, prisms, windows, etc. For clarity, it is assumed, in the example of FIG. 6, that the input composite optical signal to the WDM 200.1 comprises the eight channels $\lambda_1$-$\lambda_8$ and, thus, the eight channel ports 71-78, the seven interleaved channel separator devices 602a-602g and the six optical couplings 606a-606f are utilized. However, the input composite optical signal to the WDM 200.1 may comprise any number of channels and the number of interleaved channel separator devices, optical couplings, and channel ports may vary accordingly.

The interleaved channel separator devices 602a-602g of the WDM 200.1 are arranged in a parallel cascade configuration such that: (1) the two outputs of the device 602a are optically coupled to the device 602b and the device 602c via the optical couplings 606a and 606b, respectively; (2) the two outputs of the device 602b are optically coupled to the device 602d and the device 602e via the optical couplings 606c and 606d, respectively; (3) the two outputs of the device 602c are optically coupled to the device 602f and the device 602g via the optical couplings 606e and 606f, respectively and (4) each of the devices 606d-606g is optically coupled to a pair of the channel ports 71-78.

A composite optical signal containing channels $\lambda_1$-$\lambda_8$ enters the WDM 200.1 through input 604. The signal passes through the separator 602a. The separator 602a divides the signal into two separate signals, one containing the odd channels ($\lambda_1, \lambda_3, \lambda_5, \ldots$) delivered to separator 602b via the optical coupling 606a, and the other containing the even channels ($\lambda_2, \lambda_4, \lambda_6, \ldots$) delivered to separator 602c via the optical coupling 606b. These odd and even channels are each passed through another separator 602b and 602c, respectively, which further divides them by every other channel, as shown in FIG. 6. This division continues until only one channel is outputted to each of the channel ports 71-78.

FIG. 7 illustrates a second WDM apparatus 200.2 comprising a multi-stage parallel cascade configuration of switchable interleaved channel separator devices. Each of the switchable interleaved channel separators 602a-602g shown in FIG. 7 can function as a 1×2 switch as schematically shown in FIG. 8. The WDM apparatus 200.2 shown in FIG. 7 has a programmable parallel cascade router configuration, since each of the switchable interleaved channel separator devices 602a-602g may be programmed to route particular channels to particular paths. This programmable parallel cascade router configuration is disclosed in U.S. Pat. No. 6,263,126, assigned to the present assignee and also in a co-pending U.S. patent application assigned to the present assignee entitled "Fiber Optic Wavelength Division Multiplexer Utilizing a Multi-Stage Parallel Cascade Method of Wavelength Separation," Ser. No. 09/881,274 filed on Jun. 14, 2001. Applicant incorporates this patent and patent application herein by reference in their entirety.

The switchable interleaved channel separator devices comprising the apparatus 200.2 (FIG. 7) are similar to the interleaved channel separators comprising the apparatus 200.1 (FIG. 6) except that each switchable interleaved channel separator device can be configured in two different states as schematically illustrated in FIG. 8. As shown in FIG. 8, channels are received into a switchable interleaved channel separator device through an input port A. In the state "0", the switchable interleaved channel separator device directs odd channels (or, more generally, every second channel out of those received from port A) to output port B and even channels (or, more generally, the remaining channels) to output port D. In the state "1", the outputs are reversed such that the odd channels are directed to port D and the even channels are directed to port B. In this way, the switchable interleaved channel separator functions as a dense wavelength division multiplexer and de-multiplexer that discriminates amongst the pathways of odd and even channels and also functions as a 1×2 switch.

Returning, now, to the example illustrated in FIG. 7, the first switchable interleaved channel separator device 602a is in the switch state "0" (see FIG. 8). In switch state "0", the device 602a routes the odd channels ($\lambda_1, \lambda_3, \lambda_5, \lambda_7$) to device 602b and the even channels ($\lambda_2, \lambda_4, \lambda_6, \lambda_8$) to the device 602c. Device 602b, also in its switch state "0", routes channels $\lambda_1$ and $\lambda_5$ to device 602d, and routes channels $\lambda_3$ and $\lambda_7$ to device 602e. The device 602c is in state "1" (in this example) and thus routes channels $\lambda_4$ and $\lambda_8$ to device 602f, and routes $\lambda_2$ and $\lambda_6$ to device 602g. Similarly, the devices 602d and 602g are in the state "1" whereas the devices 602e and 602f are in the state "0", resulting in the particular set of outputs to channel ports 71-78 as shown in FIG. 7. In the example shown in FIG. 7, there are seven different independent 1×2 switchable interleaved channel separator apparatuses 602a-602g which may be programmed independently of one another. There are therefore $2^7(=128)$ different possible permutations of the output signals among the channel ports 71-78.

Reference is now made to FIG. 9A through FIG. 11, which illustrate interleaved channel separators, either switchable or non-switchable, that may be used within either the WDM system 200.1 or the WDM system 200.2 within the re-configurable optical de-multiplexer 50, the re-configurable optical multiplexer 51 or the re-configurable optical add-drop multiplexer 80. These and other suitable interleaved channel separator apparatuses are more fully described in the following U.S. patents, all of which are assigned to the present assignee and which are incorporated herein by reference in their entirety: U.S. Pat. Nos. 6,263,126; 6,130,971; 6,169,828; 6,370,296; 6,215,926; 6,310,690; 6,263,129; 6,307,677; 6,421,480; 6,396,629; 6,493,141 and 6,525,848. Additional suitable interleaved channel separator apparatuses are disclosed in the following co-pending U.S. patent applications, all of which are assigned to the present assignee and which are incorporated herein by reference in their entirety: "Fiber Optic Wavelength Division Multiplexer Utilizing a Multi-Stage Parallel Cascade Method of Wavelength Separation", Ser. No. 09/881,274, filed Jun. 14, 2001; "High-Isolation Dense Wavelength Division Multiplexer Utilizing Birefringent Plates and a Non-Linear Interferometer"; Ser. No. 09/404,005, filed Sep. 23, 1999; "Multi-Functional Optical Device Utilizing Multiple Polarization Beam Splitters and Non-Linear Interferometers", Ser. No. 09/630,891, filed Aug. 2, 2000 and "Multi-Functional Optical Device Utilizing Multiple Polarization Beam Splitters and Non-Linear Interferometers", Ser. No. 10/074,303, filed Feb. 11, 2002.

Figure 9A:
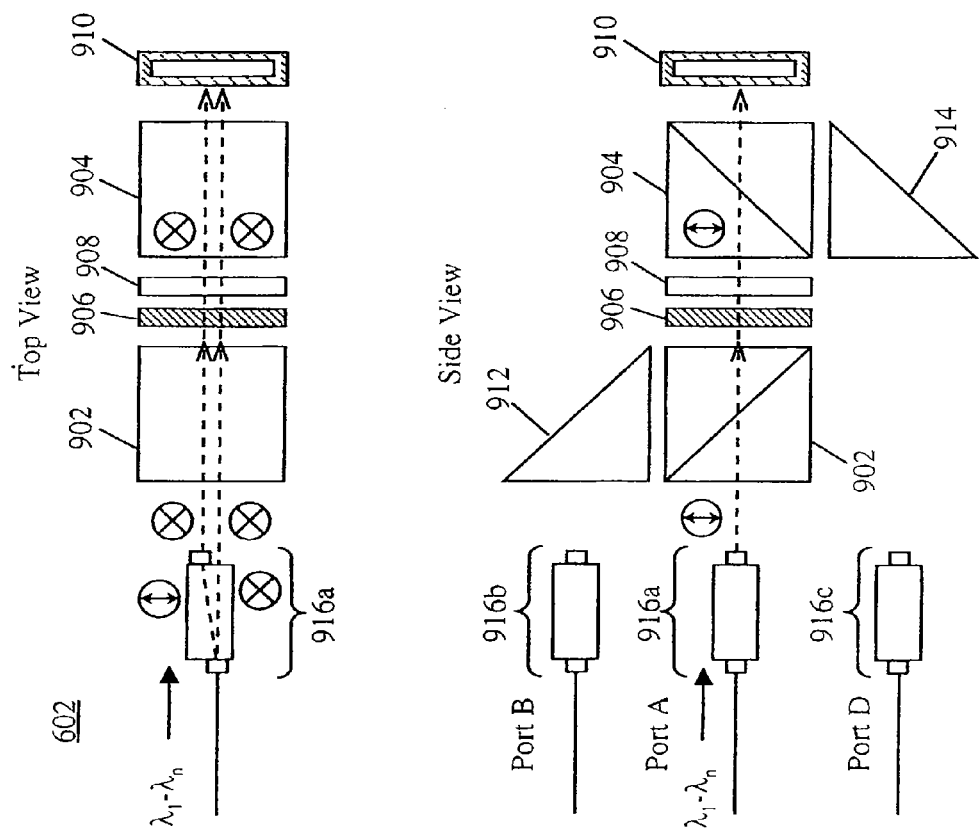
FIG. 9A is a top view and a side view of a 1×2 interleaved channel separator showing the forward pathway of signal light rays of even and odd channels therethrough.

FIG. 9A provides an illustration of a 1×2 interleaved channel separator 602 that may be used, for instance, as anyone of the apparatuses 602a-602g. As will become apparent from the following discussion, the channel separator 602 receives input from a first optical port 916a and separates the channels therein into a first set of channels and a second set of channels interleaved with the first set of channels, wherein the first set of channels is output from a first output optical port 916b and the second set of channels is output from a second output optical port 916c. As more completely described in the aforementioned U.S. patent application with Ser. No. 09/630,891, the optical ports 916a-916c either input or output linearly polarized lights and are thus also referred to herein as polarizing ports.

As shown in FIG. 9A, the 1×2 interleaved channel separator 602 comprises a first 902 and a second 904 polarization beam splitter (PBS) between which are disposed a non-reciprocal optical rotation element 906 and a reciprocal optical rotation element 908. The first PBS 902 receives optical input from the input port 916a which is disposed adjacent to a side of the PBS 902 opposite to the non-reciprocal rotator 906 and reciprocal rotator 908. A non-linear interferometer 910 is disposed adjacent to the second PBS 904 at a side opposite to the non-reciprocal rotator 906 and reciprocal rotator 908. The input port 916a, first PBS 902, second PBS 904, non-reciprocal rotator 906, reciprocal rotator 908 and non-linear interferometer 910 are disposed along a line which defines a main axis or dimension of the 1×2 interleaved channel separator 602.

Figure 9B:
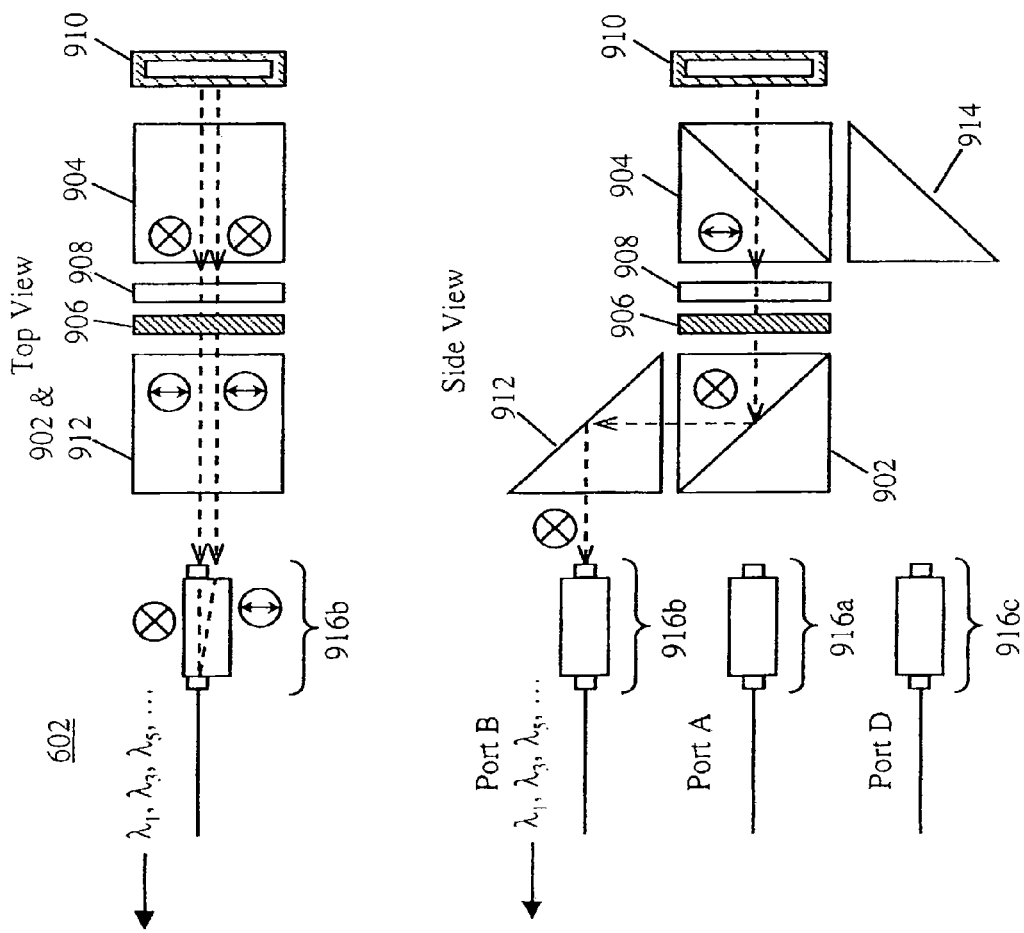

Also shown in FIGS. 9A-9C are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

A first 912 and a second 914 optical reflector are disposed adjacent to respective faces of the first PBS 902 and second PBS 904, neither of which faces intersect the main axis of the apparatus. As shown in FIG. 9A, the optical reflectors 912-914 comprise right-angle prisms, but could also comprise mirrors. The two PBS's 902-904 each have the property of transmitting signal light comprising a first polarization (p-polarization) therethrough along the main axis whilst simultaneously deflecting signal light comprising a second polarization (s-polarization) to the adjacent optical reflector. Finally, the first output port 916b and the second output port 916c are disposed such that they receive light deflected by the first 912 and second 914 optical reflector, respectively.

Referring once again to FIG. 9A, the pathways and polarization orientations of forward propagating input signal rays are shown in both top view (top diagram) and side view (lower diagram). The full set of two input beams, as separated by input port 916a, is only visible in the top view. Signal light, which is comprised of a plurality of wavelength division multiplexed channels $\lambda_1$-$\lambda_n$ is input to the first PBS 902 of interleaved channel separator 602 through input port 916a such that the two separated input beams both comprise p-polarization with respect to the first PBS 902. These two p-polarized signal light beams both pass straight through the PBS 902 and subsequently pass through the combination of the non-reciprocal optical rotator 906 and the reciprocal optical rotator 908. The elements 906-908 are disposed such that light passing through both from left to right does not experience polarization plane rotation. Thus, the signal light remains p-polarized with respect to the second PBS 904 and passes directly therethrough so as to be input to the non-linear interferometer 910.

The return pathways (that is, the pathways after reflection from and interaction with the non-linear interferometer 910)

of odd and even channels through the channel separator 602 are respectively shown in FIG. 9B and FIG. 9C. The non-linear interferometer 910 has the property of reflecting all linearly polarized light input thereto such that reflected light comprising a first set of channels (e.g., the "odd" channels) that is interleaved with a second set of channels is reflected without any polarization plane rotation whereas the reflected light comprising the second set of channels (e.g., the "even" channels) is reflected with a 90° polarization plane rotation. Thus, as illustrated in the lower diagram of FIG. 9B, the light of the reflected odd channels, whose polarization is not rotated, remains p-polarized with respect to the second PBS 904 and therefore passes without deflection directly through the PBS 904 towards the reciprocal optical rotator 908 and non-reciprocal optical rotator 906. Contrariwise, as illustrated in the lower diagram of FIG. 9C, the light of the reflected even channels, whose polarization plane is rotated by 90° upon reflection from non-linear interferometer 910, is s-polarized with respect to the second PBS 904 and therefore is deflected towards the second optical reflector 914.

During passage from right-to-left through the pair of elements 906-908, the polarization plane orientation of the light of the odd channels (FIG. 9B) is rotated by 90° and thus acquires s-polarization with respect to the first PBS 902. The first PBS 902 therefore deflects this light comprising the odd channels towards the first optical reflector 912. Thus, as illustrated in FIG. 9B and FIG. 9C, the odd channels are deflected by first reflector 912 so as to be output to the first output port 916b whereas the even channels are simultaneously deflected by second reflector 914 so as to be output to the second output port 916c. Since the ports 916b-916c are polarizing ports, the two physically separate beams comprising each set of output channels are recombined by each respective output port and focused into the respective fiber of said port.

Figure 10A:
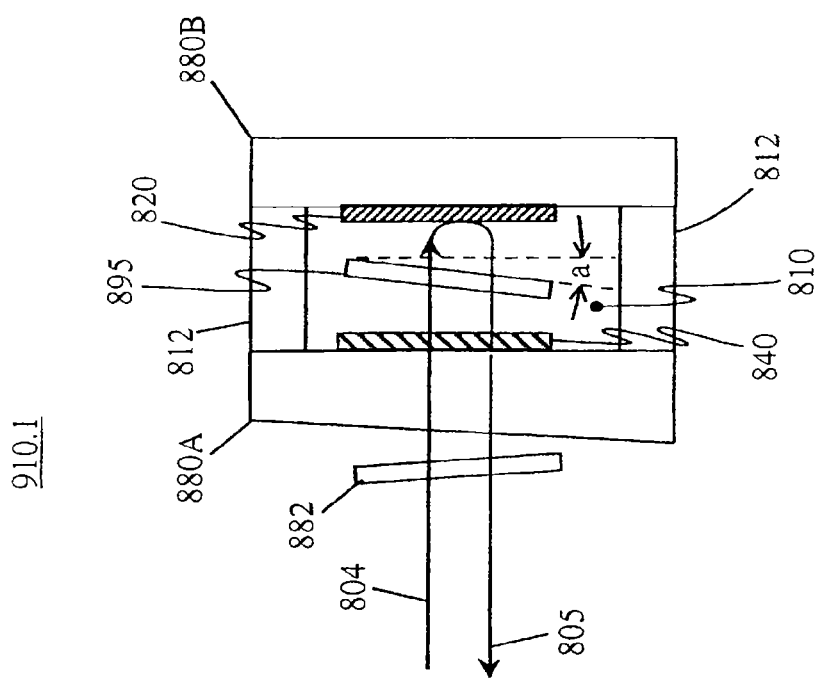
FIG. 10A is an illustration of a first non-linear interferometer that may be utilized within an interleaved channel separator apparatus.
Figure 10B:
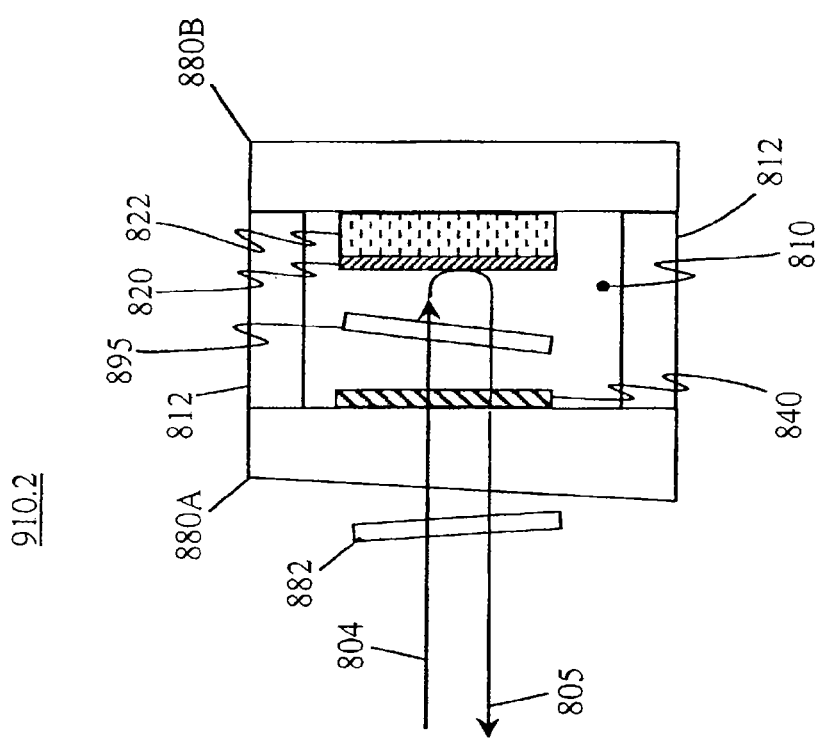
FIG. 10B is an illustration of a second non-linear interferometer that may be utilized within an interleaved channel separator apparatus.

FIGS. 10A-10B illustrate two alternative structures for a non-linear interferometer 910 as utilized within an interleaved channel separator. The non-linear interferometer 910 may be either adjustable or non-adjustable. If the non-linear interferometer is not adjustable, then the interleaved channel separator of which the non-linear interferometer is a component is not switchable. If the non-linear interferometer is adjustable, then the interleaved channel separator is switchable and may be used within the WDM system 200.2 (FIG. 7). The non-linear interferometers 910.1 (FIG. 10A) and 910.2 (FIG. 10B) are disclosed in the aforementioned U.S. Pat. No. 6,310,690, in the aforementioned co-pending U.S. patent applications with Ser. Nos. 09/772,684 and 09/404,005; in the aforementioned U.S. Pat. No. 6,525,848 and in U.S. Pat. No. 6,169,604, which latter patent is also assigned to the present assignee and which is incorporated herein by reference in its entirety.

The non-linear interferometer 910.1 (FIG. 10A) comprises two glass plates 880A-880B optically coupled to one another. The inside face of the second glass plate 880B is coated with a layer of reflective coating 820 with a reflectivity preferably of 100%. The inside face of the first glass plate 880A is substantially parallel to face 880B and is coated with a layer of a partially reflective coating 840 with a reflectivity less than 100%. The two glass plates are separated by spacers 812, such that an interferometric cavity 810 is created between the partially reflective coating 840 and the 100% reflective coating 820. The spacers 812 preferably comprise a zero-thermal-expansion or low-thermal-expansion material. The non-linear interferometer 910.1 further comprises a first birefringent wave plate 882 disposed external to the cavity 810 and optically coupled to the glass plate 880A and a second birefringent wave plate 895 disposed within the cavity 810 and optically coupled to the glass plate 880A. An input linearly polarized light 804 comprised of multiple channels is reflected as light 805, wherein the polarization of a first set of channels is rotated and the polarization of a second set of channels interleaved with the first set of channels is not rotated.

In case the non-linear interferometer 910.1 (FIG. 10A) or the non-linear interferometer 910.2 (FIG. 10B) is adjustable, then it may be changed from a first operational state to a second operational state by adjusting the optical path length $L_o$ of the cavity 810. In a first operational state, upon reflection from the adjustable non-linear interferometer, the polarization of the light of a first set of channels is rotated by 90° whilst the polarization of the light of a second set of channels is not rotated. In a second operational state, the polarization of the light of the second set of channels is rotated by 90° whilst the polarization of the light of the first set of channels is not rotated.

Figure 11:
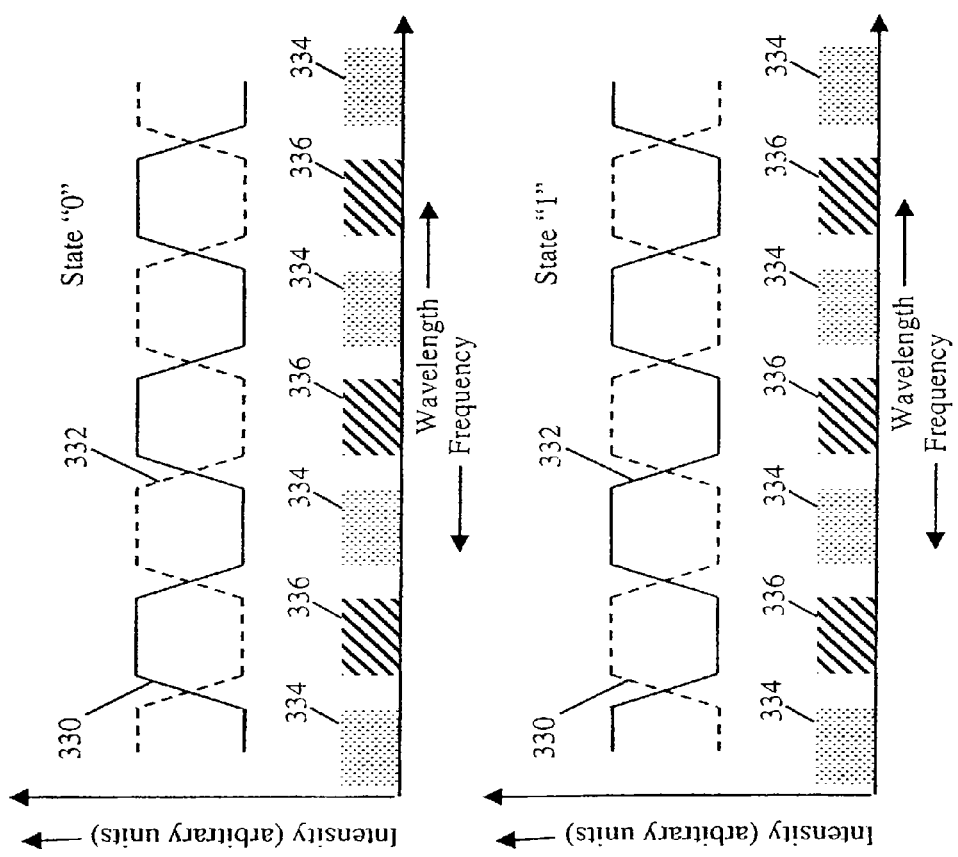
FIG. 11 is a pair of schematic graphs of the spectrum of polarization-rotated light and the spectrum of polarization-non-rotated light reflected from an adjustable non-linear interferometer in two different operational states.
Figure 12A:
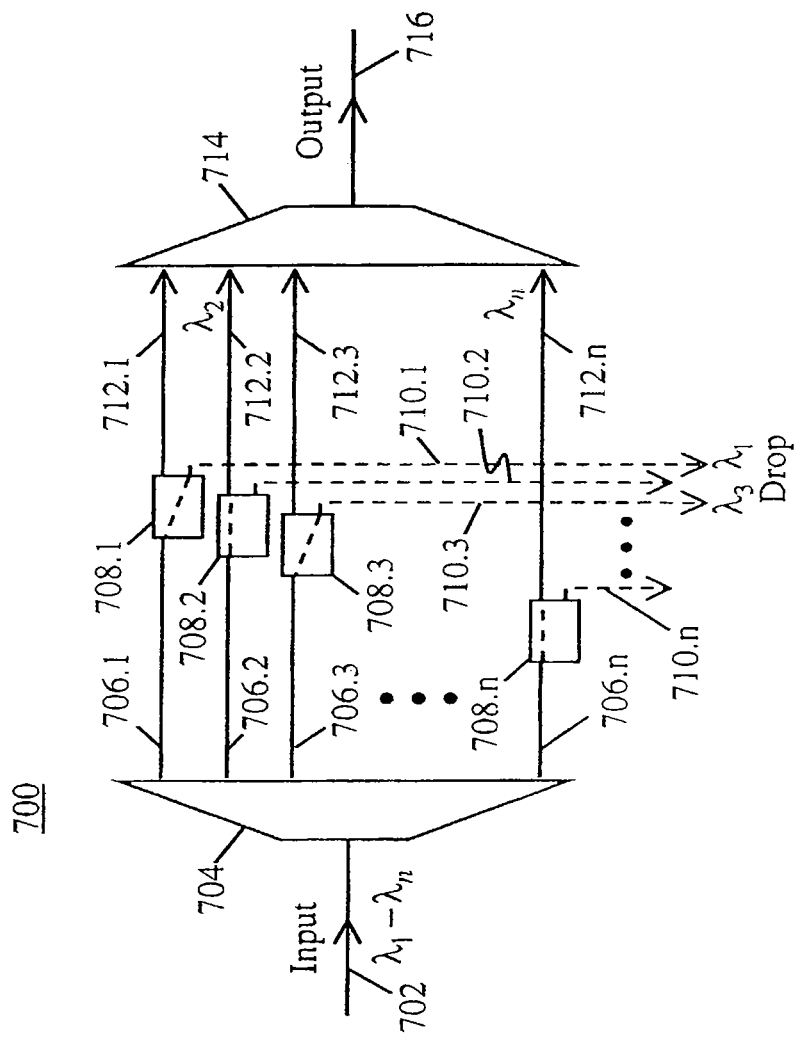
FIG. 12A is a diagram of a conventional re-configurable de-multiplexer.
Figure 12B:
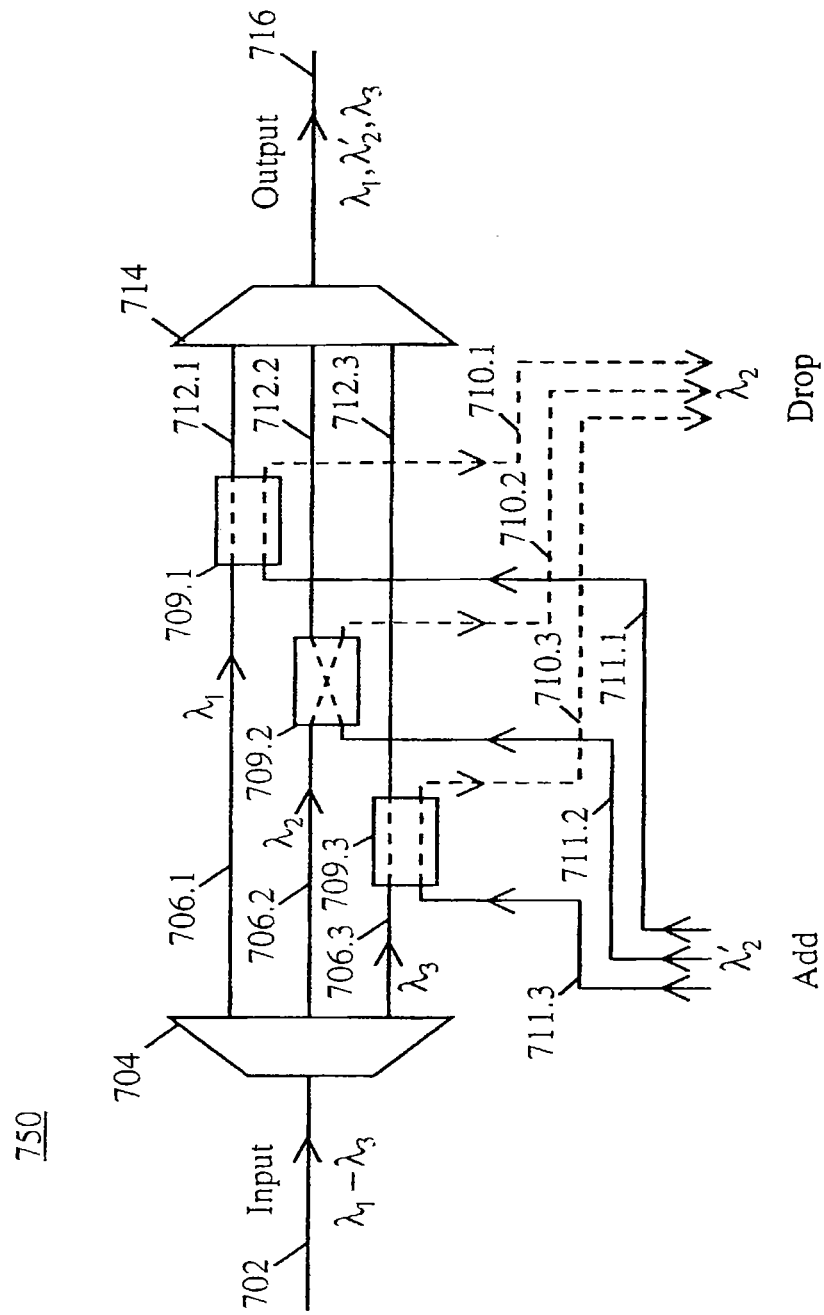
FIG. 12B is a diagram of a conventional re-configurable add-drop multiplexer.

The principle that permits the change of operational states of the adjustable non-linear interferometers 910.1-910.2 is illustrated in FIG. 11, which presents two schematic graphs of the spectrum 330 of passbands of the polarization-rotated light and the spectrum 332 of passbands of non-polarization-rotated light. The upper and lower graphs of FIG. 11 represent the spectra of pass bands reflected from an adjustable non-linear interferometer in a first operational state "0" and in a second operational state "1", respectively. The locations of "odd" channels 334 and of "even" channels 336 are also shown in the graphs of FIG. 11. As is well known, the free spectral range (in terms of frequency) of a reflective interferometer of the type shown in FIGS. 10A-10B is inversely proportional to the optical path length $L_o$, of the cavity 810. Thus, when this optical path length is increased or decreased, the spectra 330-332 of passbands effectively "shift" to either the left or the right accordingly. A very slight change in the passband widths also accompanies this shift, but this effect is negligible in regards to the operation of either of the adjustable non-linear interferometers 910.1-910.2. The effect of the shift of the spectra of passbands is to cause the spectrum of polarization rotated light to either coincide with the locations of the even channels or the odd channels, depending upon the selected operational state, as may be seen be comparing the two graphs of FIG. 11.

The non-linear interferometer 910.1 (FIG. 10A) is adjustable if the "tilt" angle α of the second birefringent wave plate 895 may be varied. The angle α is the angle at which the internal birefringent wave plate 895 is disposed (within the cavity 810) relative to the parallel reflective surfaces 820 and 840. The optical path length $L_o$ between the parallel reflective surfaces 820 and 840 depends, in part, on the optical path length $L_{895}$ through the wave plate 895. This quantity $L_{895}$ is, in turn, related to the physical path length of signals 804-805 through the element 895 as well as the principal refractive indices of element 895. Since, this physical path length depends upon the tilt angle α of element 895, then it follows that the quantity $L_{895}$ and the quantity $L_o$ depend upon the angle α. Thus, by adjusting the angle α, it is possible to tune the phase of the channels comprising the reflected light 805. The angle α may be adjusted by means of a mechanical tilt adjustment mechanism (not shown) so that the phase of the reflected channels may be varied during operation of the switchable interleaved channel separator device within which the adjustable non-linear interferometer is utilized.

The non-linear interferometer 910.2 shown in FIG. 10B comprises all the elements of the interferometer 910.1 (FIG. 10A) in addition to a piezoelectric element 822 attached to the second glass plate 880B. Instead of being disposed upon the second glass plate 880B, the 100% reflective coating comprising the adjustable non-linear interferometer 910.2 is disposed upon or mechanically coupled to the piezoelectric element 822 facing into the cavity 810 (FIG. 10B). By controlling a voltage applied across the piezoelectric element 822, the variable thickness t of the piezoelectric element 822 may be very accurately controlled. This property of piezoelectric materials is well known. In this fashion, the optical path length $L_0$ between the parallel reflective surfaces 820 and 840 may be controlled and the non-linear interferometer rendered adjustable. Thus, by adjusting the thickness, t, of the piezoelectric element 822, it is possible to control the phase of the reflected channels 805.

Although the present invention has been illustrated with the use of the interleaved channel separators illustrated in FIGS. 9A-11, one of ordinary skill in the art will readily recognize that the WDM 200.1 and the WDM 200.2 may be comprised of alternative forms of interleaved channel separators. Such apparatuses, for which switchable and non-switchable versions are known in the art, generally perform the operation of separating an input composite optical signal into a first set of channels output to a first port and a second set of channels to a second port, wherein the first and second sets of channels are interleaved with one another or the wavelengths or frequencies of the first set of channels are interleaved with the wavelengths or frequencies of the second set of channels. In general, it will generally be understood by one of ordinary skill in the art that any such interleaved channel separator or interleaver apparatus may be used within the WDM 200.1 (FIG. 6) without changing the properties of the WDM 200.1 or the properties of the WDM 200.1 or the properties of reconfigurable optical de-multiplexer, a re-configurable optical multiplexer or a re-configurable optical add/drop multiplexer in accordance with the present invention. Likewise, any switchable interleaved channel separator or interleaver apparatus may be used within the WDM 200.2 (FIG. 7) without changing the properties of the WDM 200.2 or of a re-configurable optical multiplexer, of a re-configurable optical de-multiplexer or of a re-configurable optical add/drop multiplexer in accordance with the present invention.

An improved re-configurable optical de-multiplexer, re-configurable optical multiplexer and re-configurable optical add/drop multiplexer have been disclosed. Although the present invention has been disclosed in accordance with the embodiments shown, one of ordinary skill in the art will readily recognize that there could be variations to the embodiments shown and those variations would be within the spirit and scope of the present invention. Accordingly, many modifications may be made by one of ordinary skill in the art without departing from the spirit and scope of the appended claims.

The invention claimed is:

1. A re-configurable optical de-multiplexer, comprising:
 a wavelength selective switch configured to receive a plurality of input channels and route a first subset of input channels to an output port and a second subset of input channels to an internal port, the wavelength selective switch being re-configurable such that a pathway for each input channel may be selected and changed; and
 a wavelength division de-multiplexer configured to receive the second subset of input channels and separate each of the second subset of input channels to a different output channel port,
 wherein the wavelength selective switch includes a wavelength dispersive element, a lens, and a steering device, and
 wherein the steering device comprises a plurality of elements that are individually controlled, each individual element includes an angled-back reflective element having a first reflective surface and a second reflective surface, and the angled-back reflective element is configured to direct a first polarized beam to the first reflective surface and a second polarized beam to the second reflective surface.

2. The de-multiplexer of claim of 1, wherein the wavelength selective switch is a 1×2 wavelength selective switch.

3. The de-multiplexer of claim of 1, wherein the lens is disposed between the wavelength dispersive element and the steering device.

4. The de-multiplexer of claim of 1, wherein the first reflective surface is angled relative to the second reflective surface.

5. A re-configurable optical multiplexer, comprising:
 a wavelength division multiplexer having a plurality of input channel ports for receiving a first set of input channels; and
 a wavelength selective switch configured to receive the first set of input channels and a second set of input channels and combine the input channels to produce a composite signal, the wavelength selective switch being re-configurable such that a pathway for each input channel may be selected and changed,
 wherein the wavelength selective switch includes a wavelength dispersive element, a lens, and a steering device, and
 wherein the steering device comprises a plurality of elements that are individually controlled, each individual element includes an angled-back reflective element having a first reflective surface and a second reflective surface, and the angled-back reflective element is configured to direct a first polarized beam to the first reflective surface and a second polarized beam to the second reflective surface.

6. The multiplexer of claim of 5, wherein the wavelength selective switch is a 1×2 wavelength selective switch.

7. The multiplexer of claim of 5, wherein the lens is disposed between the wavelength dispersive element and the steering device.

8. The multiplexer of claim of 5, wherein the first reflective surface is angled relative to the second reflective surface.

9. A re-configurable optical device, comprising:
 a first wavelength selective switch configured to receive a plurality of input channels and route a first subset of input channels to an output port and a second subset of input channels to an internal port;
 a wavelength division de-multiplexer configured to receive the second subset of input channels and separate each of the second subset of input channels to a different output channel port;
 a wavelength division multiplexer having a plurality of input channel ports for receiving a plurality of added input channels; and
 a second wavelength selective switch configured to receive the plurality of added input channels and the first subset of input channels and combine the input channels to produce a composite signal,
 wherein at least one wavelength selective switch is re-configurable such that a pathway for each input channel may be selected and changed and wherein the wavelength selective switch includes a wavelength dispersive element, a lens, and a steering device comprising a plurality of angled-back reflective elements, each angled-back reflective element including a first reflective surface and a second reflective surface which form a single continuous surface, each reflective surface configured to reflect beams away from the other reflective surface.

10. The optical device of claim of 9, wherein the first wavelength selective switch is a 1×2 wavelength selective switch.

11. The optical device of claim of 9, wherein the angled-back reflective elements are individually controlled.

12. A re-configurable optical device, comprising:
a first wavelength selective switch;
a wavelength division de-multiplexer optically coupled to the first wavelength selective switch;
a wavelength division multiplexer; and
a second wavelength selective switch optically coupled to the wavelength division multiplexer and the first wavelength selective switch, wherein at least one wavelength selective switch includes a wavelength dispersive element and a plurality of angled-back reflective elements, each angled-back reflective element including a first reflective surface and a second reflective surface which form a single continuous surface, the first reflective surface being configured to direct a first beam from the wavelength dispersive element and the second reflective surface being configured to direct a second beam from the wavelength dispersive element.

13. The optical device of claim 12, wherein the first reflective surface is angled relative to the second reflective surface.

14. The optical device of claim 12, wherein the wavelength selective switch is a 1×2 wavelength selective switch.

15. A re-configurable optical de-multiplexer, comprising:
a wavelength selective switch configured to receive an input signal containing a plurality of input channels and route a first set of the input channels along a first output path and a second set of the input channels along a second output path, the wavelength selective switch including a dispersive element for separating the input signal into individual channels and a steering device for selectively directing the individual channels to one of the first and second output paths, wherein the steering device comprises a plurality of angled-back reflective elements, each angled-back reflective element including a first reflective surface and a second reflective surface which form a single continuous surface, each reflective surface configured to reflect beams away from the other reflective surface; and
a wavelength division de-multiplexer configured to receive the second set of the input channels and direct each of the input channels in the second set along a different optical path.

16. The de-multiplexer of claim 15, wherein the plurality of angled-back reflective elements are individually controlled.

17. The de-multiplexer of claim 15, wherein the first set of the input channels and the second set of the input channels are defined according to configurable settings of the wavelength selective switch.

18. A re-configurable optical multiplexer, comprising:
a wavelength division multiplexer for producing an optical signal containing a first set of channels from a plurality of input signals; and
a wavelength selective switch configured to receive the optical signal containing the first set of channels from the wavelength division multiplexer and an optical signal containing a second set of channels and combine the optical signals to produce a composite signal having the first and second set of channels, the wavelength selective switch including a dispersive element for separating the optical signals into individual channels and a steering device for directing the individual channels along an optical path of the composite signal, wherein the steering device comprises a plurality of angled-back reflective elements, each angled-back reflective element including a first reflective surface and a second reflective surface which form a single continuous surface, each reflective surface configured to reflect beams away from the other reflective surface.

19. The multiplexer of claim 18, wherein the plurality of angled-back reflective elements are individually controlled.

20. The multiplexer of claim 18, wherein the first set of the input channels and the second set of the input channels are defined according to configurable settings of the wavelength selective switch.

21. A re-configurable optical de-multiplexer, comprising:
a wavelength selective switch configured to receive a plurality of input channels and route a first subset of input channels to an output port and a second subset of input channels to an internal port, the wavelength selective switch being re-configurable such that a pathway for each input channel may be selected and changed; and
a wavelength division de-multiplexer configured to receive the second subset of input channels and separate each of the second subset of input channels to a different output channel port,
wherein the wavelength selective switch includes a wavelength dispersive element, a lens, and a steering device, and
wherein the steering device comprises a plurality of elements that are individually controlled, each individual element includes an angled-back reflective element having a first reflective surface and a second reflective surface, a polarization modulator, and a birefringent polarization beam displacer optically coupled to the angled-back reflective element.

22. A re-configurable optical multiplexer, comprising:
a wavelength division multiplexer having a plurality of input channel ports for receiving a first set of input channels; and
a wavelength selective switch configured to receive the first set of input channels and a second set of input channels and combine the input channels to produce a composite signal, the wavelength selective switch being re-configurable such that a pathway for each input channel may be selected and changed,
wherein the wavelength selective switch includes a wavelength dispersive element, a lens, and a steering device, and
wherein the steering device comprises a plurality of elements that are individually controlled, each individual element includes an angled-back reflective element having a first reflective surface and a second reflective surface, a polarization modulator, and a birefringent polarization beam displacer optically coupled to the angled-back reflective element.

* * * * *